United States Patent
Kurase

(10) Patent No.: US 6,636,325 B1
(45) Date of Patent: Oct. 21, 2003

(54) PRINTER SYSTEM AND METHOD OF CONTROLLING OPERATION OF THE SAME

(75) Inventor: Hiroyuki Kurase, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 661 days.

(21) Appl. No.: 09/253,001

(22) Filed: Feb. 19, 1999

(65) Prior Publication Data (65)

Related U.S. Application Data

(62) Division of application No. 08/903,878, filed on Jul. 31, 1997.

(30) Foreign Application Priority Data

| Jul. 31, 1996 | (JP) | ............................................ 8-216986 |
| Sep. 30, 1996 | (JP) | ............................................ 8-276745 |

(51) Int. Cl.$^7$ ............................ G06F 13/00; G06F 3/12
(52) U.S. Cl. ..................................... 358/1.14; 358/1.15
(58) Field of Search ............................. 358/1.14, 1.15, 358/1.16, 1.17, 1.1, 1.2, 1.12

(56) References Cited

U.S. PATENT DOCUMENTS

| 5,163,123 A | 11/1992 | Kadono | ...................... 395/116 |
| 5,619,623 A | * 4/1997 | Takayanagi et al. | ......... 395/114 |
| 5,654,804 A | * 8/1997 | Hattori | ........................ 358/404 |
| 5,691,820 A | * 11/1997 | Komatsu | ..................... 358/434 |
| 5,710,873 A | * 1/1998 | Romano et al. | ............ 395/115 |

FOREIGN PATENT DOCUMENTS

| EP | 0622755 | 11/1994 | .......... G06K/15/00 |
| EP | 0705023 | 4/1996 | ............ H04N/1/32 |

* cited by examiner

*Primary Examiner*—David Moore
*Assistant Examiner*—Douglas Tran
(74) *Attorney, Agent, or Firm*—Birch, Stewart, Kolasch & Birch, LLP

(57) ABSTRACT

To reduce the necessary storage capacity of the internal memory of a printer, a printing start command is transmitted from a printer controller to a printer by asynchronous transfer before the transmission of image data. Isochronous transfer of image data to be printed in packet units starts upon elapse of a fixed period of time following transmission of the printing start command. Image data thenceforth is transmitted from the printer controller to the printer successively by isochronous transfer at a fixed period. Since the image data is transmitted from the printer controller to the printer at the fixed period, printing can be performed at a constant speed without requiring that the printer be provided with an image memory for storing image data representing one frame of an image. In a case where a transfer request command is supplied from the printer to the printer controller, the image data is transmitted from the printer controller to the printer in response to the transfer request command.

18 Claims, 20 Drawing Sheets

CYCLE-START PACKET FORMAT

ASYNCHRONOUS DATA PACKET FORMAT

ASYNCHRONOUS COMMAND PACKET FORMAT

ASYNCHRONOUS DATA PACKET FORMAT

PRINTER SYSTEM AND METHOD OF CONTROLLING OPERATION OF THE SAME

This application is a continuation divisional of application Ser. No. 08/903,878, filed on Jul. 31, 1997, the entire contents of which are hereby incorporated by reference.

BACKGROUND OF THE INVENTION

1. Field of the Invention

This invention relates to a printer system constituted by a printer controller and a printer interconnected by a bus. The printer controller constituting the printer system supplies the printer with image data via the bus, and the printer prints the image, which is represented by the image data supplied by the printer controller, at a constant speed. The present invention further relates to the printer and printer controller that construct this printer system. The present invention relates to a method of controlling the operation of the printer system, a method of controlling the operation of the printer and a method of controlling the operation of the printer controller.

2. Description of the Background Art

Parallel communication using a Centronics interface or an SCSI (Small Computer System Interface) and serial communication using an RS232C, RS422 or USB (Universal Serial Bus) are utilized to transmit image data from a printer controller to a printer. With these communication schemes, image data is transmitted from the printer controller to the printer irrespective of the printing speed of the printer. It is required that the printer be provided with an image memory having enough storage capacity to store image data representing at least one frame of an image (the image printed on one sheet of paper). This makes it difficult to lower the cost of the printer.

SUMMARY OF THE INVENTION

Accordingly, an object of the present invention is to make it possible to construct a printer using an image memory having a comparatively small storage capacity.

In order to supply a printer with image data from a printer controller, the present invention utilizes IEEE (Institute of Electrical and Electronic Engineers, Inc.) Standard 1394 for high-speed serial transmission. With IEEE Standard 1394, which is currently under consideration in the art, isochronous transfer and asynchronous transfer are possible.

With isochronous transfer, data referred to as cycle-start packet data is in principle generated at an isochronous cycle (125 $\mu$s) by any of a plurality of nodes connected by a bus. Data is transmitted from a certain node (this node is a cycle master, as will be described later) to another node every isochronous cycle. Isochronous transfer, which makes it possible to perform data transmission without fail within the isochronous cycle, transmits data unilaterally from the transmitter to the receiver. Asynchronous transfer is such that when the receiver receives transmitted data, a signal indicating that the data has been received is sent back to the transmitter.

A first aspect of the present invention provides a printer system constituted by a printer and a printer controller. The printer and the printer controller in this printer system are connected by a bus, and the printer controller supplies the printer with image data via the bus. The printer prints the image, which is represented by image data supplied by the printer controller, at a constant speed.

The printer is equipped with a buffer memory having an image-data storage capacity smaller than the quantity of image data representing one frame of the image, the buffer memory temporarily storing the image data supplied by the printer controller. Either the printer or the printer controller is provided with a device for generating a start signal which indicates start of supply of the image data.

The printer controller has image-data transmission start control means (an image-data transmission start controller) for starting transmission of image data to the printer in packet units upon elapse of a predetermined period of time from generation of the start signal, and image-data transmission control means (an image-data transmission controller) for repeating, in packet units, the transmission of image data to the printer in such a manner that the image data that has been stored in the buffer memory will not be emptied from the buffer memory.

The printer has storage control means (a storage controller) for receiving image data transmitted from the printer controller and storing this image data in the buffer memory, and printing control means (a printing controller) for reading out the image data that has been stored in the buffer memory and printing an image, which is represented by the image data read out, at a constant speed.

The first aspect of the present invention also provides an operation control method suited to the printer system described above. Specifically, there is provided a method of controlling operation of a printer system constituted by a printer controller and a printer connected by a bus, wherein the printer controller supplies the printer with image data via the bus and an image, which is represented by image data supplied by the printer controller, is printed in the printer at a constant speed. The printer is provided with a buffer memory having an image-data storage capacity smaller than the quantity of image data representing one frame of the image, the buffer memory temporarily storing the image data supplied, and either the printer or the printer controller generates a start signal.

The method further includes starting transmission of image data from the printer controller upon elapse of a predetermined period of time from generation of the start signal, repeating, in packet units, the transmission of image data from the printer controller in such a manner that the image data that has been stored in the buffer memory will not be emptied from the buffer memory, and, in the printer, receiving image data transmitted from the printer controller, storing this image data in the buffer memory, reading out image data that has been stored in the buffer memory and printing an image, which is represented by the image data read out, at a constant speed.

In accordance with the first aspect of the present invention, the printer is provided with the buffer memory having a storage capacity capable of storing image data the amount of which is less than the amount of image data representing one frame of an image (which means, as described above, the image printed on one sheet of paper).

In the printer controller, transmission of image data to the printer from the printer controller in packet units is started upon elapse of a predetermined period of time from generation of the start signal, and transmission of the image data to the printer from the printer controller in packet units is repeated in such a manner that the image data that has been stored in the buffer memory will not be emptied from the buffer memory.

The image data that has been transmitted is received by the printer in packet units and is stored temporarily in the buffer memory of the printer. The image data that has been stored in the buffer memory is read out and the image represented by the read image data is printed at a constant speed.

The printer need not be provided with a memory having a large storage capacity capable of storing the quantity of image data representing one frame of an image. It will suffice to provide the printer with a buffer memory of small capacity, thereby lowering the cost of the printer.

The continuity of image data can be maintained because succeeding data is transmitted from the printer controller before the data already in the buffer memory vanishes. Accordingly, the printer used can be one which prints images at a constant speed.

Printing speed data representing the printing speed and storage capacity data representing the storage capacity of the buffer memory may be stored in the printer. In such case the stored printing speed data and storage capacity data would be transmitted to the printer controller.

The printer controller receives the printing speed data and storage capacity data transmitted from the printer and determines the amount of image data included in a packet based upon the printing speed data and storage capacity data received.

The printing speed and the storage capacity of the buffer memory may be entered into the printer controller. In such case the amount of data included in a packet would be determined based upon the printing speed data and storage capacity data entered.

In either case, the optimum amount of image data included in a packet can be determined.

A print preparation command may be transmitted from the printer controller to the printer before the start of the printing operation by the printer. In such case printing preparation inclusive of positioning printing paper at a home position would be performed in response to the printing preparation command transmitted from the printer controller, printing preparation-end data representing end of printing preparation would be transmitted to the printer controller in response to end of printing preparation, and the above-mentioned start signal would be generated following the transmission of the printing preparation-end data.

Since the image data is transmitted from the printer controller to the printer upon completion of printing preparations, the image data can be prevented from being transmitted before the printer has attained a state in which it is capable of printing. This precludes printing processing errors.

Command identification data may be added to the printing preparation command to indicate that it is a command, and image-data identification data may be added to the image data transmitted from the printer controller to indicate that this data is image data. In this case, whether received data is the printing preparation command or the image data is judged in the printer based upon the command identification data or image-data identification data, the printer performs printing preparation in response to judging that the received data is the printing preparation command and prints the image represented by the image data in response to judging that the received data is the image data.

Since received data can thus be recognized immediately as being a command or image data, printing preparation and printing can be executed rapidly.

An arrangement may be adopted in which the printer controller is equipped with first and second control means (a first controller and a second controller), wherein the first controller is made to perform transmission control relating to transmission of image data to the printer, and the second controller is made to control operations other than transmission control.

As a result, the burden of the control operation by the second controller is alleviated.

There may be a plurality of the printers, each may be assigned a specific printer identification symbol (channel number or ID), and printer identification data which represents the specific printer identification symbol may be added to the image data output by the printer controller.

In this case it is determined in the printer whether the printer identification symbol represented by the printer identification data added onto the received image data agrees with the assigned printer identification symbol. If it is judged that the two agree, the printer performs printing by a printing head based upon the image data having the attached printer identification data representing the identification symbol of the printer.

Desired image data can be transmitted only to a desired printer even in a case where a plurality of printers have been connected to the printer controller. The same image data can be transmitted to all of the printers as a matter of course.

A second aspect of the present invention provides a printer system constituted by a printer and a printer controller. The printer and the printer controller in this printer system are connected by a bus, and the printer controller supplies the printer with image data via the bus. The printer prints the image, which is represented by image data supplied by the printer controller, at a constant speed.

The printer is equipped with a buffer memory having an image-data storage capacity smaller than the quantity of image data representing one frame of the image, the buffer memory temporarily storing the image data supplied by the printer controller, and with means for outputting an image-data transfer request.

The printer controller has image-data transmission control means for transmitting image data to the printer in packet units in response to output of the transfer request.

The printer has storage control means for receiving image data transmitted from the printer controller and storing this image data in the buffer memory, and printing control means for reading out the image data that has been stored in the buffer memory and printing an image, which is represented by the image data read out, at a constant speed.

The second aspect of the present invention also provides an operation control method suited to the printer system described above. Specifically, there is provided a method of controlling operation of a printer system constituted by a printer controller and a printer connected by a bus, wherein the printer controller supplies the printer with image data via the bus and an image, which is represented by image data supplied by the printer controller, is printed in the printer at a constant speed. The printer is provided with a buffer memory having an image-data storage capacity smaller than the quantity of image data representing one frame of the image, the buffer memory temporarily storing the image data supplied by the printer controller, and means for outputting an image-data transfer request.

The method further includes transmitting image data from the printer controller in packet units in response to output of the transfer request from the printer, and, in the printer, receiving image data transmitted from the printer controller, storing this image data in the buffer memory, reading out image data that has been stored in the buffer memory and printing an image, which is represented by the image data read out, at a constant speed.

In the second aspect of the present invention as well, the printer need not be provided with a memory having a large storage capacity capable of storing the quantity of image data representing one frame of an image. It will suffice to provide the printer with a buffer memory of small capacity, thereby lowering the cost of the printer.

It will suffice if the transfer request is output from the printer substantially whenever one line of one frame of an image is printed, by way of example.

Further, the continuity of the image data can be maintained by having the printer output the image-data transfer request in such a manner that the image data that has been stored in the buffer memory will not vanish from the buffer memory.

Furthermore, the amount of image data included in the packet may be changed and the image data transmitted from the controller in such a manner that the image data that has been stored in the buffer memory will not vanish.

It may be so arranged that after image data has been transmitted by the image-data transmission controller in response to output of the transfer request, the transmission of null data is repeated by the printer controller in packet units until the next output of the transfer request.

Thus, the amount of image data that is stored in the buffer memory can be adjusted.

The printer preferably performs printing-related preparations (printer heat-up, positioning of the printing paper, positioning of the printing head, etc.) in response to entry of a printing-preparation setting request command. In such case the above-mentioned transfer request would be output upon completion of the printing-related preparations. Image data can be prevented from being transferred from the printer controller before the printing-related preparations are completed.

The printing-preparation setting request command may be output from the printer controller. In this case the printer controller repeats the transmission of null data in packet units from output of the printing-preparation setting request command to output of the transfer request.

A predetermined routine can be used without changing the routine for transmitting the image data.

In a case where a plurality of printers have been connected to the printer controller, the printer controller would respond to output of the transfer request from all printers by transmitting image data to all of these printers in packet units.

In both the first and second aspects of the present invention, the printer and printer controller constituting the printer system can be arranged so as to be separate from each other.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS (1) Data Transfer Based Upon IEEE Standard 1394

Before describing a printer system according to embodiments of the present invention, a data transfer based upon IEEE Standard 1394 will be discussed.

Figure 16:
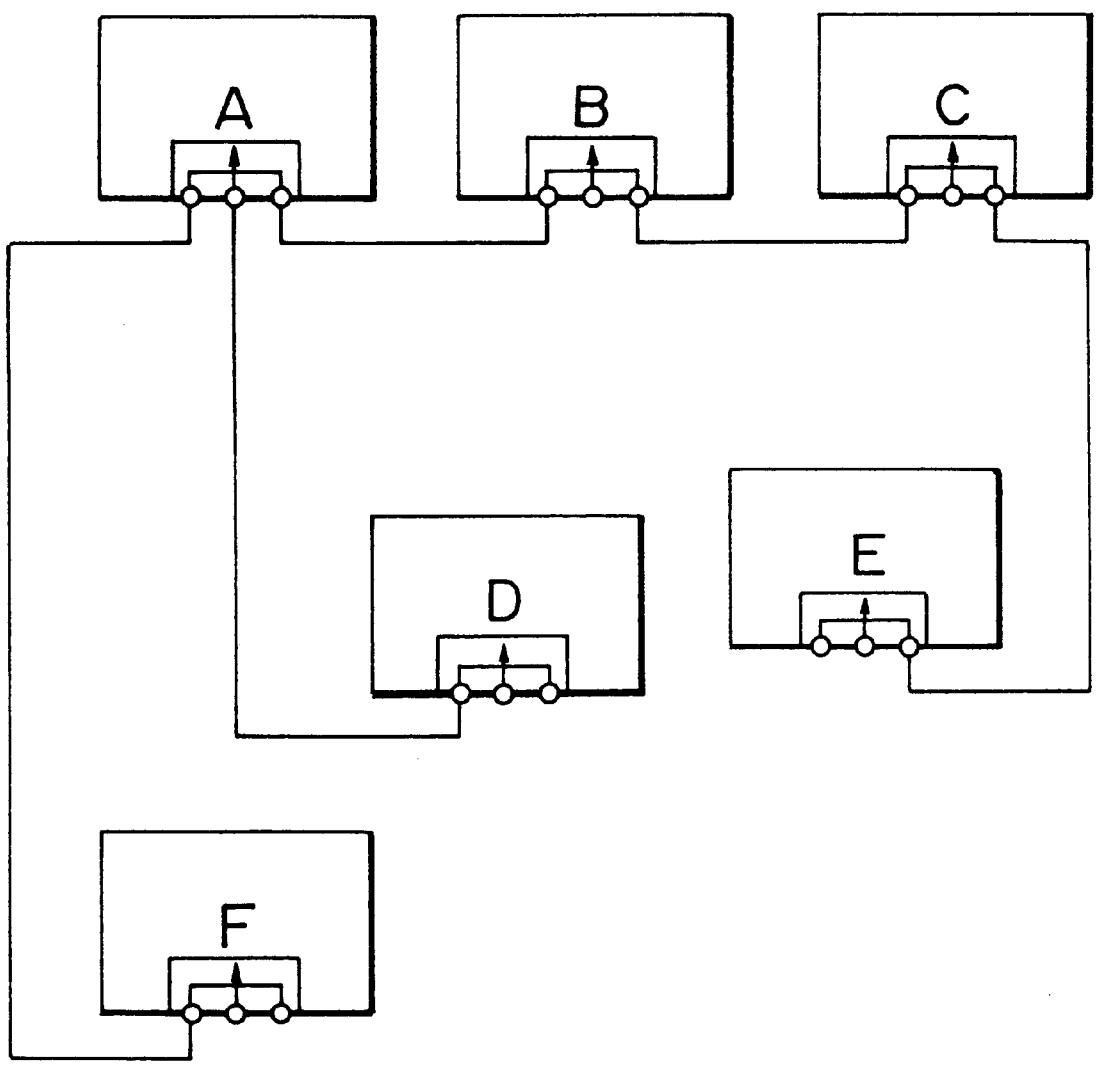
FIG. 16 is a block diagram of devices connected in accordance with IEEE Standard 1394.

FIG. 16 illustrates the manner in which a plurality of devices (a computer, a printer, a digital video tape recorder, etc.) A, B, C, D, E and F are connected using a bus. Each device has one or a plurality of ports (in the example of FIG. 16, all devices have three ports). It is possible to connect a maximum of 63 devices by connecting the ports of the devices. According to IEEE Standard 1394, devices can be connected as long as the daisy chain connections do not exceed 16. There are no loop connections.

Further, according to IEEE standard 1394, two types of data transfer are possible, namely isochronous transfer and asynchronous transfer. Data transfer is performed in packet units in both isochronous transfer and asynchronous transfer.

Figure 19:
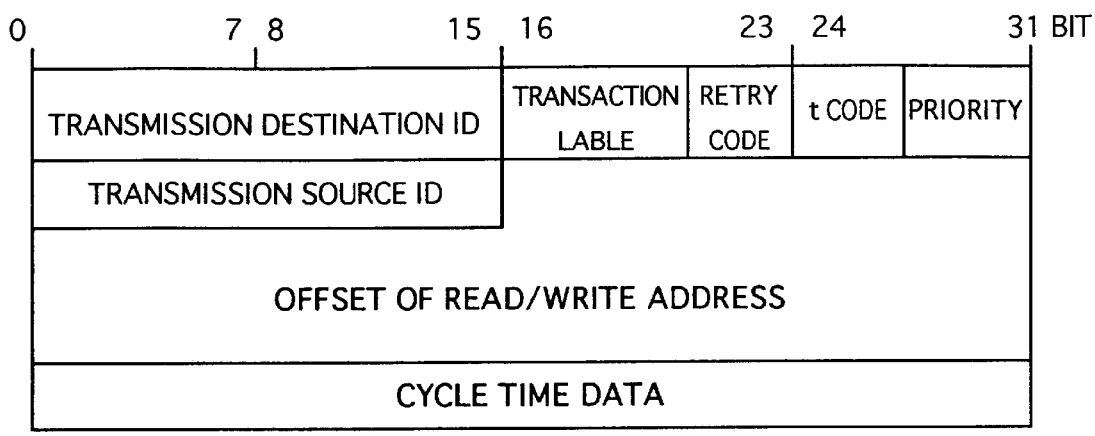
FIG. 19 illustrates the format of a cycle-start packet.

FIG. 19 illustrates the format of a cycle-start packet. The cycle-start packet data represents the start of an isochronous cycle period (which, in principle, has a duration of 125 $\mu$s) and is transmitted from a cycle master by isochronous transfer, as will be described later.

The cycle-start packet includes the ID of the transmission destination (the ID is specific to the device), a transaction label, a retry code, a t-code indicative of asynchronous transfer data or isochronous transfer data, priority which indicates the degree of priority of transmitted data, the ID of the source of transmission, an offset of a read/write address, cycle time data and a data CRC (cyclic redundancy check).

According to IEEE standard 1394, the cycle master, which is described later, starts measuring time from the moment the power supply is turned on. The data representing the measured time is cycle time data. Nodes, which are described later, each have a counter capable of measuring time. The counter of each node is reset when it receives the cycle-start packet data transmitted from the cycle master. As mentioned above, the cycle-start packet is in principle output every 125 $\mu$s but a delay is also allowed (the details will be described later). The delay time is referred to as "cycle-start delay time". The cycle-start delay time is calculated at each node based upon the difference between the time measured by the cycle master and represented by the cycle time data and time measured at each node. For example, when the time measured by the cycle master is 130 $\mu$s and the time measured by each node when the cycle-start packet data has been applied is 125 $\mu$s, the cycle-start delay time is 130 $\mu$s–125 $\mu$s=5 $\mu$s.

Figure 20:
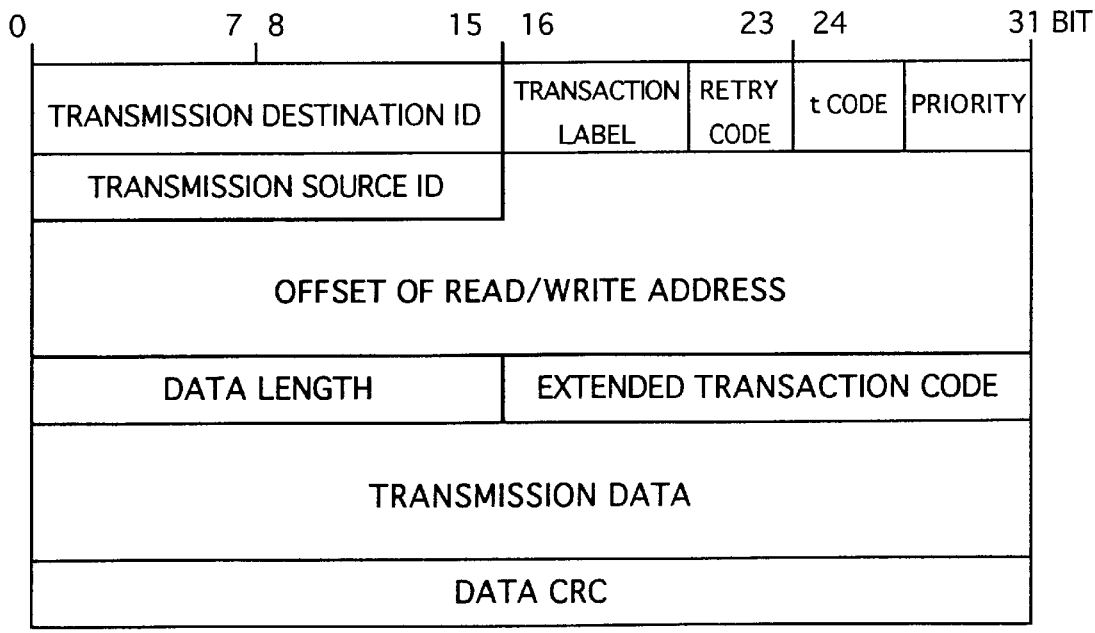
FIG. 20 illustrates the packet format of data transferred isochronously.

An asynchronous data packet format shown in FIG. 20 is used in a case where data is transmitted by asynchronous transfer. This format differs from the format of the cycle-start packet format only in that data length, an extended transaction code and transmission data are included in place of data representing the cycle-start delay time.

In a case where there are two or more control devices which control one device to undergo control, it is possible for only one control device to control the device to be controlled. This is referred to as "exclusive control". An extension transaction code is employed to specify an arithmetic operation used to check whether or not exclusive control is being carried out.

Figure 21:
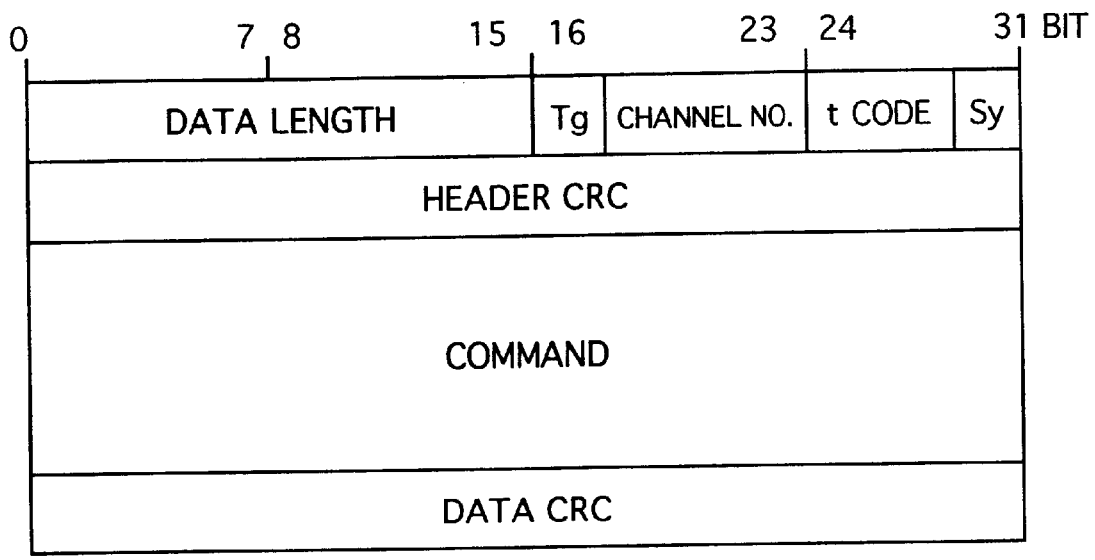
FIG. 21 illustrates the format of an isochronous command packet.
Figure 22:
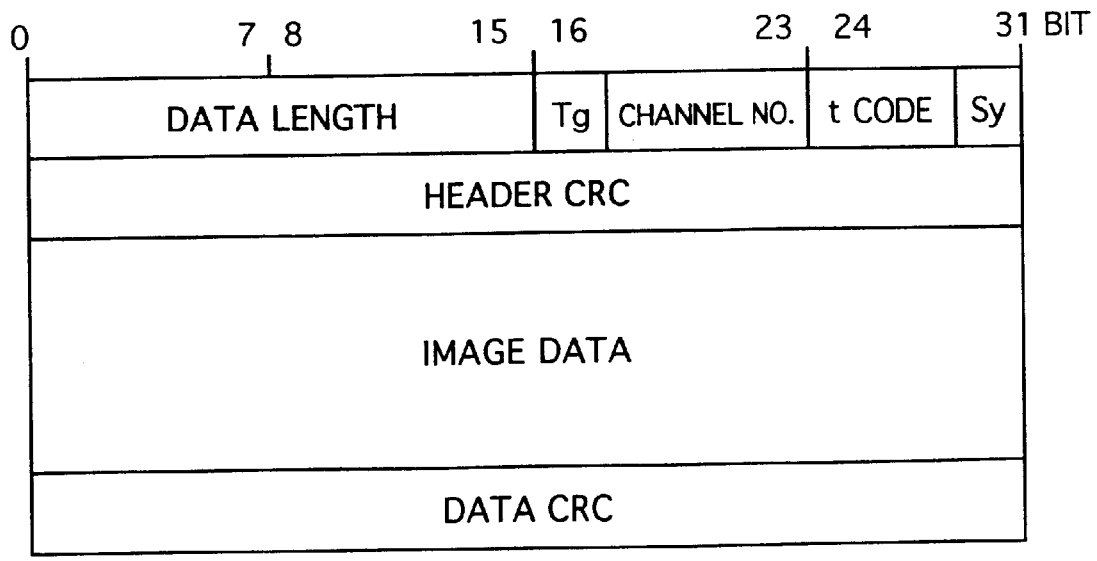
FIG. 22 illustrates the format of an isochronous data packet.

FIGS. 21 and 22 illustrate the formats of packets used in isochronous transfer. FIG. 21 illustrates the format of an isochronous command packet used in a case where a command is transmitted, and FIG. 22 illustrates the format of an isochronous data packet used in a case where image data is transmitted.

These packet formats include data length indicating the length of the data, a channel number assigned to a command or image data, a t-code, Sy, which indicates a synchronizing bit, a header CRC, which is an error detection code for detection of an error in the data from the data length to the synchronizing bit Sy, a command or image data, and data CRC, which is an error detection code for detection of an error in the command or image data. In isochronous transfer, a channel number is assigned to each device and, when the channel number assigned to a device and the channel number included in the transmitted packet agree, the device having the assigned channel number that agrees with the channel number of the transmitted packet receives the transmitted command or image data. Further, "00" is recorded as Tg since the purpose of use is not specified according to the stipulation of the currently prevailing IEEE Standard 1394.

With reference again to FIG. 16, a master-slave relationship between the devices connected by the bus is decided according to IEEE standard 1394. A method of deciding this master-slave relationship will now be described.

When the power supply of each device is turned on, a certain device makes an inquiry of another device regarding the master-slave relationship between them. The device that make the master-slave inquiry is the slave and the device that receives the master-slave inquiry is the master.

Figure 17:
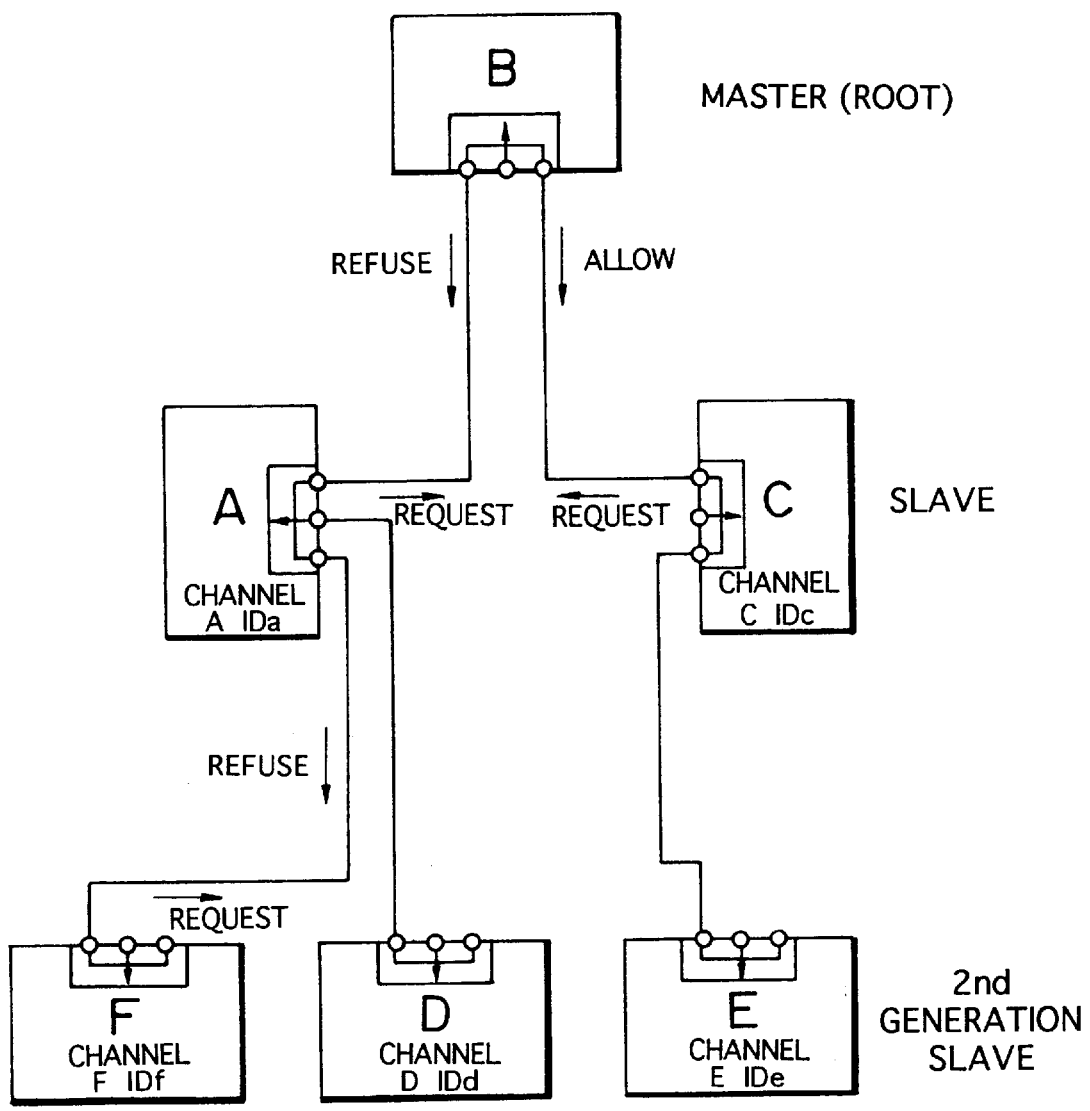
FIG. 17 is a block diagram of devices, which have been connected in accordance with IEEE Standard 1394, arranged in the form of a tree structure.

When the master-slave relationship has been decided for all of the devices, the overall configuration takes on a tree structure, as shown in FIG. 17. In the example illustrated in FIG. 17, device B is the master (the root). The devices A and C are the slaves of the device B, the devices D and F are the slaves of the device A (a second generation of slaves as seen from the device B), and the device E is the slave of the device C (a second-generation slave as seen from the device B).

According to IEEE Standard 1394, each device is assigned a channel number in order to receive the data of an isochronous transfer, and each device is assigned an ID in order to receive the data of an asynchronous transfer, as mentioned above. In the illustrated example, Channel No. A and IDa have been assigned to the device A, Channel No. B and IDb to the device B, Channel No. C and IDc to the device C, Channel No. D and IDd to the device D, and Channel No. E and IDe to the device E.

Figure 18:
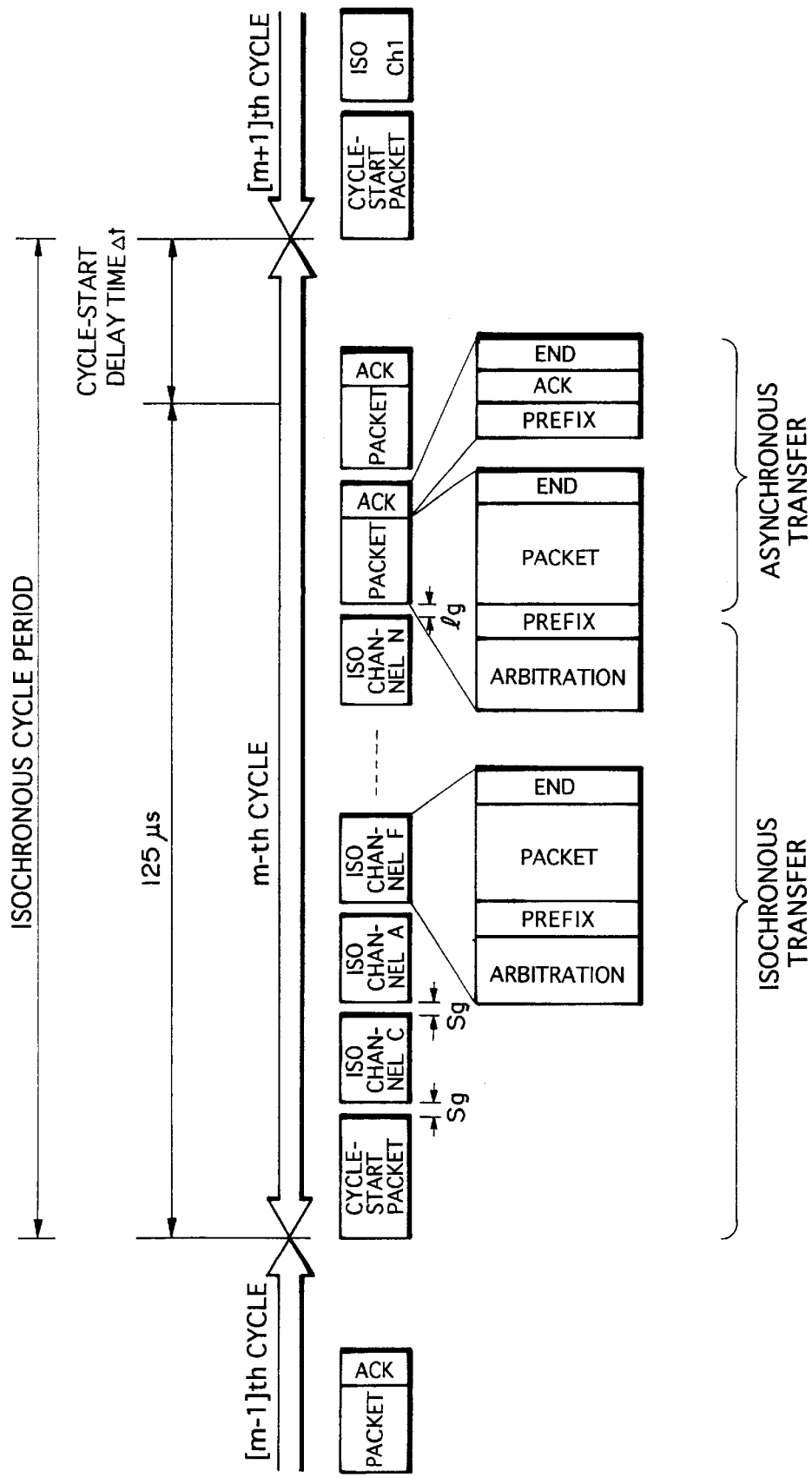
FIG. 18 is a time chart of isochronous transfer.

FIG. 18 is a time chart of isochronous transfer.

Control of isochronous transfer is performed by the device referred to as the cycle master. The root is the cycle master.

A cycle starts in response to output of the cycle-start packet from the cycle master (root). The cycle-start packet is applied to all devices (inclusive of second-generation devices) that have been connected to the root.

The transfer of isochronous data starts after transmission of the cycle-start packet.

Upon elapse of a first time period (the time period of the short gap) Sg following transmission of the cycle-start packet, arbitration is carried out among all devices that wish to perform an isochronous transfer. Arbitration involves receiving permission to use the bus and is performed in the following manner:

First, signals requesting use of the bus are transmitted to a master device from the devices attempting to conduct the isochronous transfer. The request signals are transmitted in order starting from the devices closest to the root. A master device that has received the request signal relays the request signal to its master device. As a result, request signals from all of the devices that wish to perform an isochronous transfer reach the cycle master. Which device should be given priority to make use of the bus has been stored in the cycle master. The device which can use the bus is decided at elapse of the short gap Sg in accordance with the stored order of priority. The cycle master outputs a signal, which allows use of the bus, solely to the decided device at the elapse of the short gap Sg. A signal refusing use of the bus is transmitted from the cycle master to the other devices at the elapse of the short gap Sg. The device that has received the signal allowing use of the bus is capable of transmitting data.

In the example of FIG. 17, signals requesting use of the bus are transmitted from the devices A, C and F, and these request signals are received by the device B serving as the root. A signal allowing use of the bus is transmitted from the root device B to the device C, thereby making it possible for the device C to transmit data. Signals refusing use of the bus are transmitted to the devices A and F, as a result of which the devices A and F become incapable of transmitting data at this time. The devices A and F perform arbitration again after the device C transmits one packet of data, and transmit data upon receiving the signal allowing use of the bus.

With reference again to FIG. 18, the isochronous transfer data is transmitted in packet units from the device that has obtained the right to path use at elapse of the short gap Sg following the transmission of the cycle-start packet. Prefix data representing the beginning of data is added on in front of the data in the packet of isochronous transfer data (having the format shown in FIG. 21 or FIG. 22), and end data representing the end of data is added on to follow the packet.

The end data is applied to all of the devices, as a result of which all of the devices recognize that the bus is idle. A device that wishes to transmit isochronous transfer data at elapse of the short gap Sg following reception of the end data again transmits the signal requesting use of the bus, i.e., performs arbitration again, in the manner described above (once a device has obtained the right to bus use in the time period of the isochronous cycle, this device does not output the request signal again in this isochronous cycle period. All devices that perform an isochronous transfer are capable of transmitting one packet of data at any point in time within the isochronous cycle period).

When an isochronous transfer is completed in the isochronous period, the right to use the path for an asynchronous transfer is acquired at the moment a second time period (a long gap lg) elapses. The data of the asynchronous transfer is transmitted in packet units from the device that has acquired the right to bus use. In this asynchronous transfer also the prefix data representing the beginning of data is attached in front of the packet and the end data is attached to follow the packet. In the asynchronous transfer, the receiving device in the asynchronous transfer outputs acknowledge data ACK, which indicates the fact that reception has taken place, to the device that transmitted the asynchronous transfer data. Prefix data and end data are added on in front and in back of this acknowledge data as well.

If the amount of data asynchronously transferred is large, the transmission interval of the cycle-start packet will exceed 125 µs. If the transmission interval of the cycle-start packet exceeds 125 µs, a delay time At for delaying the transmitted cycle-start packet is calculated based upon measured time represented by the cycle time data and the measured time at each node (see FIG. 19), as set forth earlier.

(2) First Embodiment

A printer system according to a first embodiment of the present invention is constructed by interconnecting a printer 20 and printer controller 10, which controls printing by the printer 20, by a cable that conforms to IEEE Standard 1394.

Figure 1:
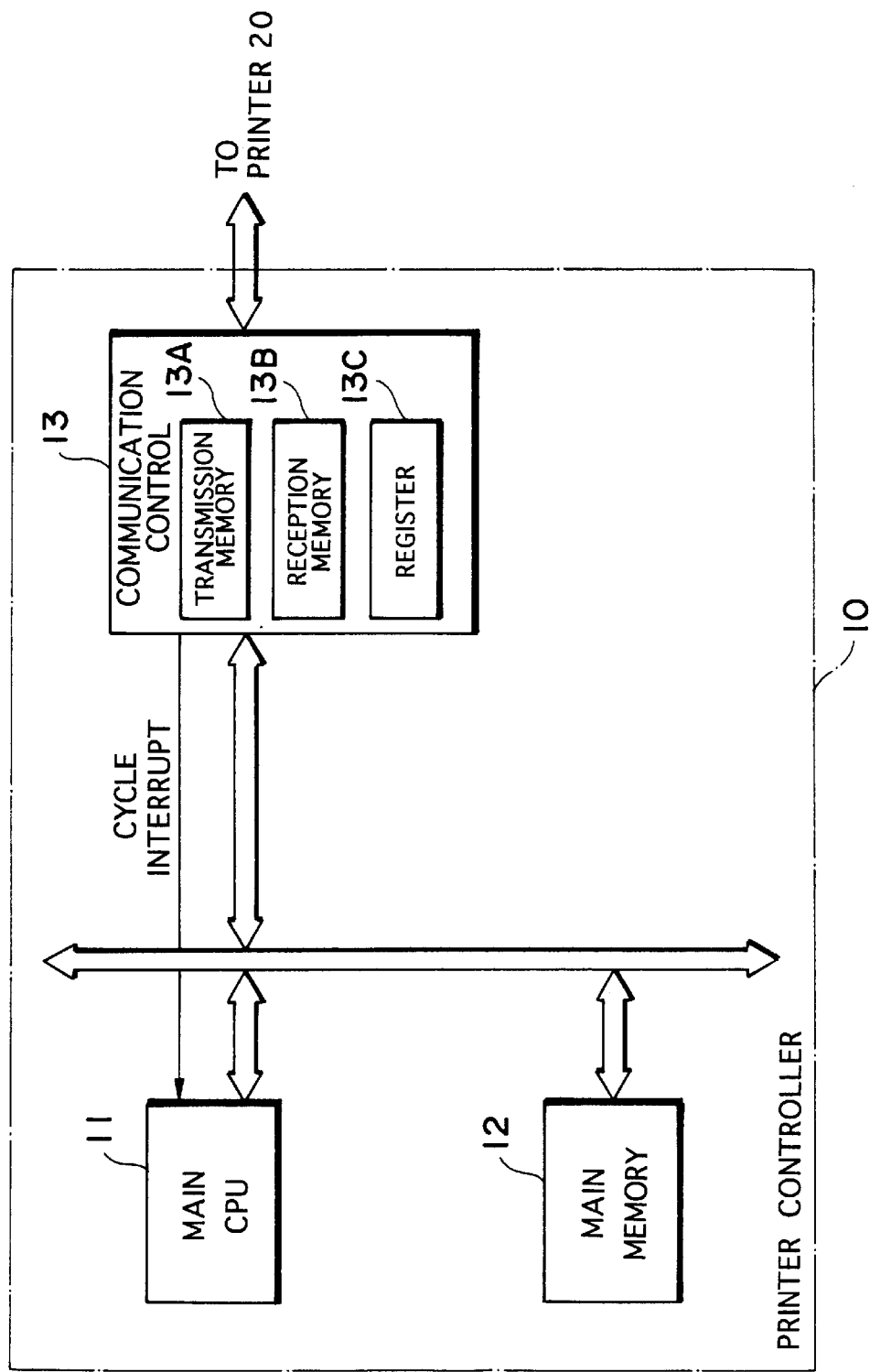
FIG. 1 is a block diagram illustrating the electrical configuration of a printer controller.

FIG. 1 is a block diagram illustrating the electrical configuration of the printer controller 10.

The overall operation of the printer controller 10 is supervised by a main CPU 11. The controller 10 includes a main memory 12 in which are stored a program for operating the printer controller 10, image data transmitted to the printer 20 representing images to be printed by the printer 20, and other data. The printer controller 10 further includes a communication control circuit 13 for carrying out an isochronous transfer and an asynchronous transfer. The communication control circuit 13 includes a transmission transfer memory 13A for temporarily storing one packet of data to be transmitted, a reception transfer memory 13B for temporarily storing one packet of data that has been transmitted from the printer 20, and a register 13C for storing data presenting the ID of the printer controller 10 and data representing the channel number. When an isochronous transfer is carried out, the communication control circuit 13 interrupts the main CPU 11 at the isochronous time period. The main CPU 11 responds to the interrupt by reading the image data out of the main memory 12.

Figure 2:
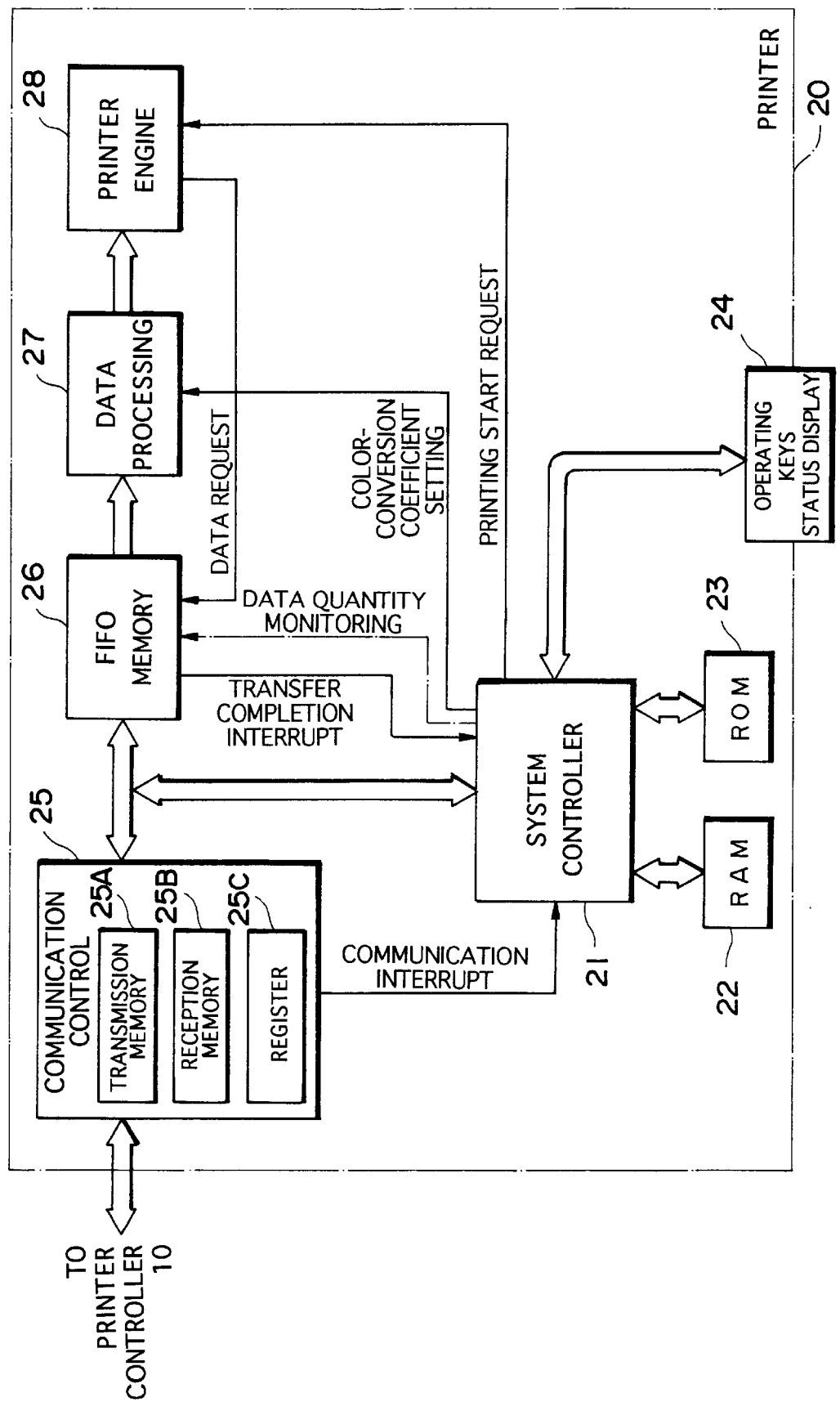
FIG. 2 is a block diagram illustrating the electrical configuration of a printer.

FIG. 2 is a block diagram illustrating the electrical configuration of the printer 20.

The overall operation of the printer 20 is supervised by the system controller 21. Connected to the system controller 21 are a RAM 22 for temporarily storing data such as data representing the current status (inclusive of whether or not printing paper has been loaded) of the printer 20, and a ROM 23 which stores the program that operates the printer 20, printer specifications data which includes the printing speed of the printer 20 and the storage capacities of a transmission transfer memory 25A, reception transfer memory 25B and FIFO (first-in first-out) memory 26, and other data as well. The printer 20 further includes operating keys and a status display circuit 24. A signal representing a setting made by the operating keys is applied to the system controller 21, and the status of the printer 20 is displayed by the status display circuit 24.

The printer 20 also includes a communication control circuit 25 for performing the above-described isochronous transfer and asynchronous transfer. The communication control circuit 25 includes a transmission transfer memory 25A for temporarily storing one packet of data to be transmitted, a reception transfer memory 25B for temporarily storing one packet of data that has been transmitted from the printer controller 10, and a register 25C for storing data representing the ID of the printer 20 and the channel number. When one packet of data is received, a communication interrupt is generated in the communication control circuit 25 and is applied to the system controller 21. The received data is transferred to the FIFO memory 26 in response to the interrupt.

The printer 20 includes the FIFO memory 26. The latter has a storage capacity capable of storing two lines of image data from among the image data representing the image printed by the printer 20.

A printer engine 28 includes a printing head which starts printing in response to a printing-start request signal from the system controller 21. When the printing-start request signal from the system controller 21 is applied to the printer engine 28, the latter generates a data request signal that is applied to the FIFO memory 26. In response to the data request signal from the printer engine 28, the image data that has been stored is output from the FIFO memory 26. When one line of image data is output from the FIFO memory 26, the latter applies a transfer-completion interrupt signal to the system controller 21. As a result, the system controller 21 recognizes that one line of image data has been output from the FIFO memory 26.

The data output by the FIFO memory 26 is applied to a data processing circuit 27, which executes data processing inclusive of color-conversion processing based upon color-conversion coefficients set by the system controller 21. The image data processed and output by the data processing circuit 27 is applied to the printer engine 28, which prints the image at a constant speed by means of the printing head included in the printer engine.

Figure 3:
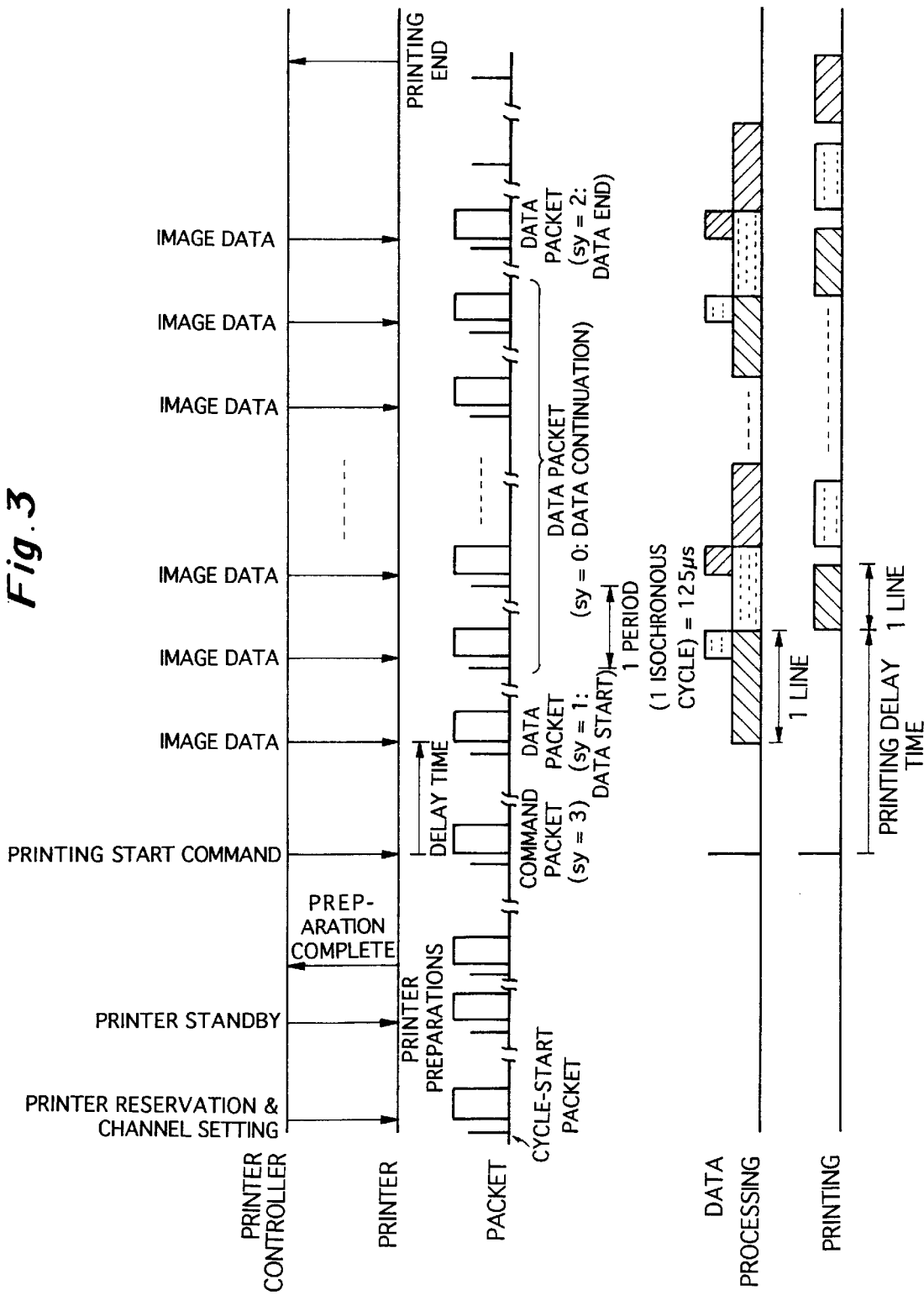
FIG. 3 is a time chart for a case in which image data is transmitted from the printer controller to the printer.
Figure 4:
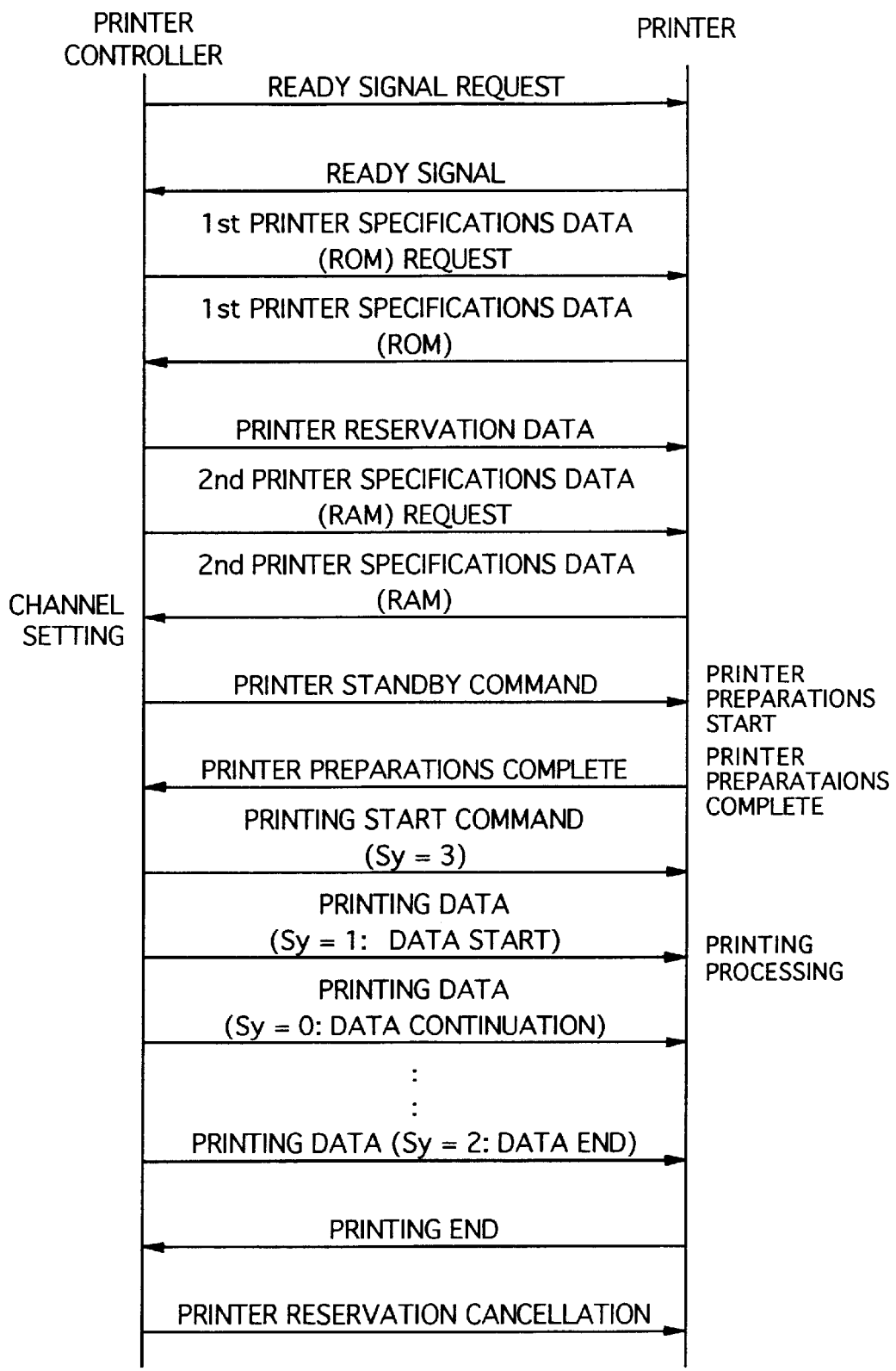
FIG. 4 illustrates commands and data sent and received by the printer controller and printer in a case where image data is transmitted from the printer controller to the printer.

FIG. 3 is a time chart for a case in which image data is transmitted from the printer controller 10 to the printer 20, and FIG. 4 illustrates the manner in which commands and data are sent and received by the printer controller 10 and printer 20 when image data is transmitted from the printer controller 10 to the printer 20. It will be assumed for the sake of simplicity that one printer controller 10 and one printer 20 are connected. Since it is possible to connect a total of 63 devices in accordance with IEEE Standard 1394, as mentioned above, 63 devices inclusive of the printer and controller can be connected and image data can be transmitted to and printed by a desired printer. As exemplified in FIGS. 1 and 2, the printer controller 10 is the master (the cycle master) and the printer 20 is the slave, by way of example.

First, a command requesting output of a ready signal is output by the printer controller 10 and the command is applied to the printer 20. When the signal requesting output of the ready signal is received by the printer 20, the system controller 21 refers to the RAM 22 and outputs a ready signal if the ready state has been attained. Upon receiving the ready signal, the 10 printer controller 10 outputs a command requesting first printer specifications data and applies the command to the printer 20. When the printer 20 receives the command requesting first printer specifications data, fixed specifications data relating to the printer 20, which specifications include the printing speed of the printer 20 and the storage capacity of the FIFO memory 26, are read out from the ROM 23 by the system controller 21. The fixed specifications data are supplied from the printer 20 to the printer controller 10.

Next, the printer controller 10 provides the printer 20 with printer reservation data. This printer reservation data is data which sets the printer 20 in such a manner that it will accept transmission of image data from the printer controller 10. This data is written in to the RAM 22 of the printer 20. Furthermore, a command requesting second printer specifications data is output by the printer controller 10 and applied to the printer 20. When the second printer specifications data is received by the printer 20, the data representing the current status of the printer 20 is read out from the RAM 22 by the system controller 21. The data representing the current status is supplied from the printer 20 to the printer controller 10.

The sending and receiving of data or commands by the printer controller 10 and printer 20 thus far is carried out by asynchronous transfer in accordance with the format shown in FIG. 20. It is of course permissible to adopt an arrangement in which isochronous transfer is used. Data transferred following a print standby command, described next, is transferred isochronously.

Next, in order that an isochronous transfer may take place between the printer controller 10 and the printer 20, channel numbers are set for the printer controller 10 and printer 20. Data representing the channel number that has been set in the printer controller 10 is stored in the register 13C, and the channel number that has been set in the printer 20 also is stored in the register 13C.

When the channel numbers are set, a printer standby command is generated in the communication control circuit 13, under the control of the main CPU 11, in accordance with the packet format illustrated in FIG. 22, and the command is transmitted from the printer controller 10 to the printer 20. When the printer standby command is received by the printer 20, printing preparations such as positioning of the printing paper at the home position begins. When the printing preparations in the printer 20 are completed, data indicative of the completion of printing preparations are output by the printer 20 and this data is applied to the printer controller 10.

When the data representing the completion of printing preparations is received by the printer controller 10, the latter generates a printing start command. According to the printing start command, the content of the synchronizing bit Sy becomes "3" in order to express the printing start command. This command is supplied from the printer controller 10 to the printer 20.

When the printing start command is output from the printer controller 10, transmission data of an amount capable of being transmitted in one packet is read out of the main memory 12, and the data is applied to and stored temporarily in the transmission transfer memory 13A contained in the communication control circuit 13. A packet is generated in the communication control circuit 13 in accordance with the format shown in FIG. 22. When image data representing the initial portion of an image is transmitted, the synchronizing bit Sy is made "1" so as to express this fact. The packet data thus generated is transmitted from the printer controller 10 upon elapse of a fixed delay following output of the printing start command. The packet data is received by the printer 20. Since the fixed delay is assured, the image data will be sent to the printer 20 when the printing head thereof actually starts operating. The FIFO memory 26 used here can have a small storage capacity.

In the example illustrating in FIGS. 1 and 2, one printer 20 is connected to one printer controller 10 and therefore the sending and receiving of data in the isochronous cycle time period takes place only between the printer controller 10 and the printer 20. The amount of image data transmitted from the printer controller 10 to the printer 20 can be increased up to the limit allowed in isochronous transfer. The transfer of the image data takes place rapidly.

One packet of data transmitted from the printer controller 10 is stored temporarily in the reception transfer memory 25B contained in the communication control circuit 25. By comparing the data representing the channel number included in the one packet of data and the data representing the channel number stored in the register 25, the communication control circuit 25 determines whether the data is data that has been transmitted to itself as the destination. If it is determined that the data has been transmitted to itself as the destination, the communication control circuit 25 generates a communication interrupt and writes the data to the FIFO memory 26 successively under the control of the system controller 21.

Next, the image data is transmitted from the printer controller 10 to the printer 20 one packet at a time at a fixed period. The synchronizing bit Sy of the packet is made "0" up to image data that represents the final portion of the image. This indicates the fact that the image data is still continuing.

The image data received by the printer 20 is stored successively in the FIFO memory 26, the image data is read out in accordance with the data request signal from the printer engine 28 and the data is applied to the printer engine 28 via the data processing circuit 27. As a result, the image is printed at a constant speed by the printing head contained in the printer engine 28.

Since the image data is transmitted from the printer controller 10 at a constant period at all times, the printer 20 need not be equipped with a large-capacity image memory for storing one frame of image data. Printing at a constant speed is made possible merely by providing the FIFO memory 26 that is capable of storing only a few lines of image data.

When the image data representing the final part of the image is read out of the main memory 12, the synchronizing bit Sy is set to "2" and packet data is generated in the communication control circuit 13. The final part of the image data is transmitted from the printer controller 10 to the printer 20, whereupon the transmission of one frame of image data ends.

When transmission of the image data ends, data indicative of the end of printing is supplied from the printer 20 to the printer controller 10. When the printer controller 10 receives the data indicating the end of printing, the printer controller 10 applies a printer deactivation command to the printer 20. When the printer receives the printer deactivation command, the image data that has been stored in the RAM 22 is erased and the printer 20 is initialized.

Figure 5:
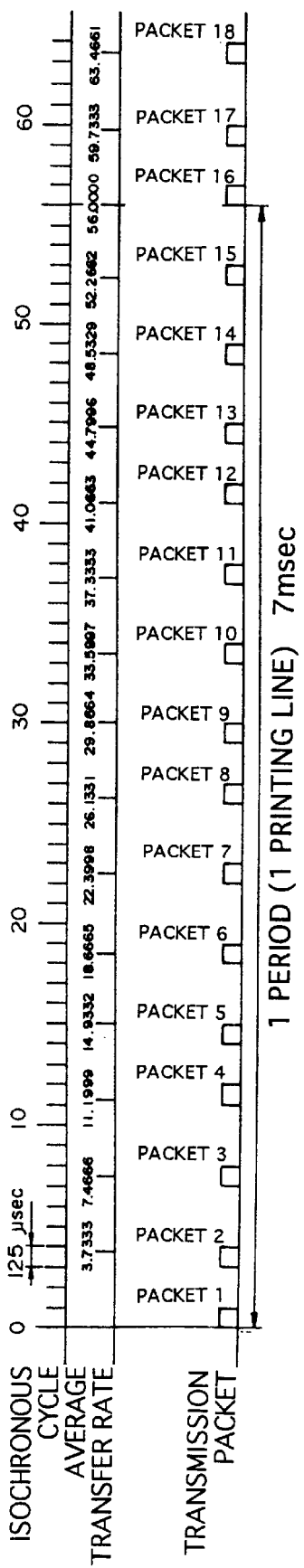
FIG. 5 is a time chart illustrating an example of the transfer rate of image data.

FIG. 5 is a time chart illustrating a specific transfer rate of image data.

Assume here that an image is represented by R (red), G (green) and B (blue) data. Further, assume that the image to be printed requires 2560 bytes per one L line of one color. Accordingly, 7680 bytes of image data per line are required for the total of three colors R, G and B. Assume also that the length of time (the line period of the printer) necessary to print one line is 7 ms, and that 512 bytes of image data per packet can be transmitted by isochronous transfer. If the 7680 bytes of image data necessary for one line are divided by image data in an amount of 512 bytes capable of being transmitted per packet, the number of packets required for one line can be calculated (i.e., 7680 bytes/512 bytes=15 packets).

The number of isochronous transfer cycles in one line period of the printer 20 can be calculated by dividing one line period (7 ms) of the printer 20 by the isochronous cycle period (125 $\mu$s) (7 ms/125 $\mu$s=56 cycles).

The number of isochronous cycles contained in one line period of the printer 20 is 56. Since it will suffice if 15 packets can be transmitted in 56 cycles, then 56 cycles are divided by 15 packets (56 cycles/15 packets=3.733 cycles) and it will suffice to arrange it so that one packet of image data is transmitted from the printer controller 10 to the printer 20 every 3.733 cycles. Null data is transmitted from the printer controller 10 to the printer 20 during the 3.733 cycles.

Figure 6:
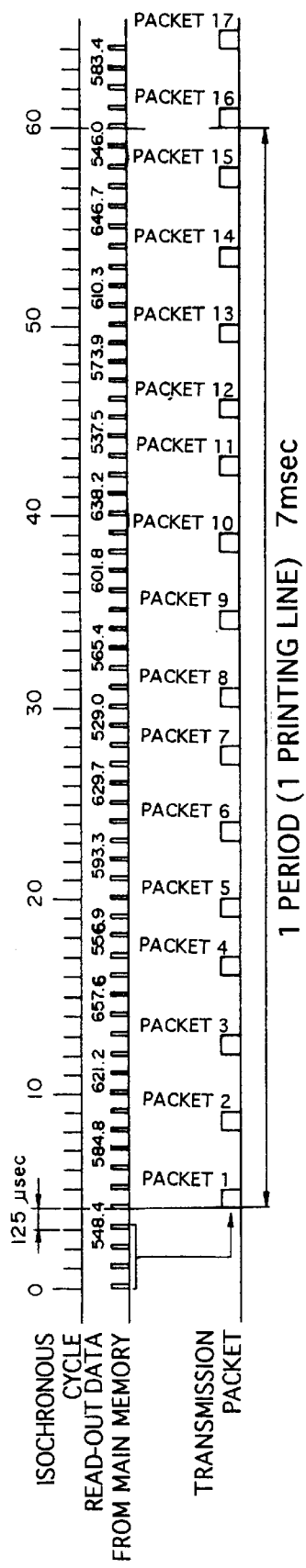
FIG. 6 is a time chart illustrating another example of the transfer rate of image data.

FIG. 6 is a time chart illustrating another transfer rate of the image data.

Since one line of image data requires 7680 bytes per 7 ms, 137.1 bytes of image data per one isochronous cycle of 125 $\mu$s are necessary (7680 bytes/7 $\mu$s=137.1 bytes/125 $\mu$s). Accordingly, 137.1 bytes of image data are read out of the main memory 12 in one isochronous cycle period, the image data is applied to the transmission transfer memory 13A contained in the communication control circuit 13 and, after one packet of image data of 142 bytes has accumulated in the transmission transfer memory 13A, the image data is transferred from the printer controller 10 to the printer 20.

Figure 7:
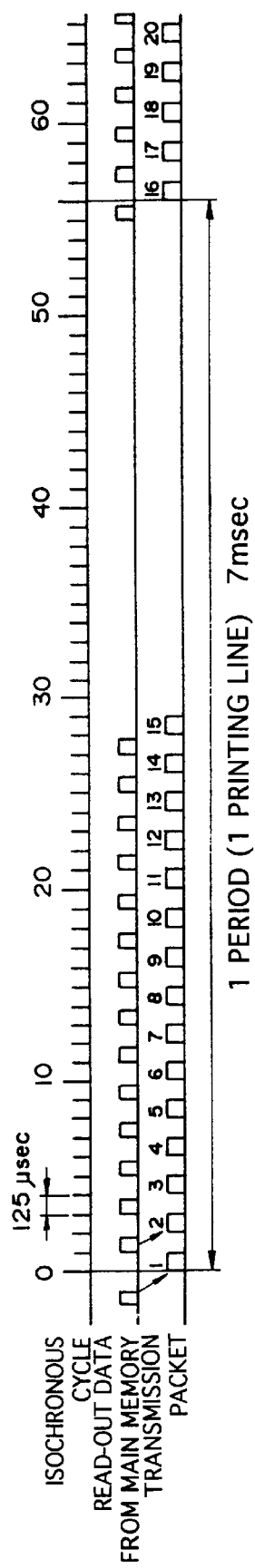
FIG. 7 is a time chart illustrating another example of the transfer rate of image data.

FIG. 7 is a time chart illustrating another transfer rate of the image data.

As shown in FIG. 7, one packet of image data is read out of the main memory 12 every other isochronous cycle and the image data is stored in the transmission transfer memory 13A included in the communication control circuit 13. The image data that has been stored in the transmission transfer memory 13A is transmitted from the printer controller 10 to the printer 20 every other isochronous cycle.

An arrangement may be adopted in which one packet of image data is transmitted from the printer controller 10 to the printer 20 continuously every other isochronous cycle, as already described above, without transferring the image data, as illustrated in FIGS. 5 through 7.

Figure 8:
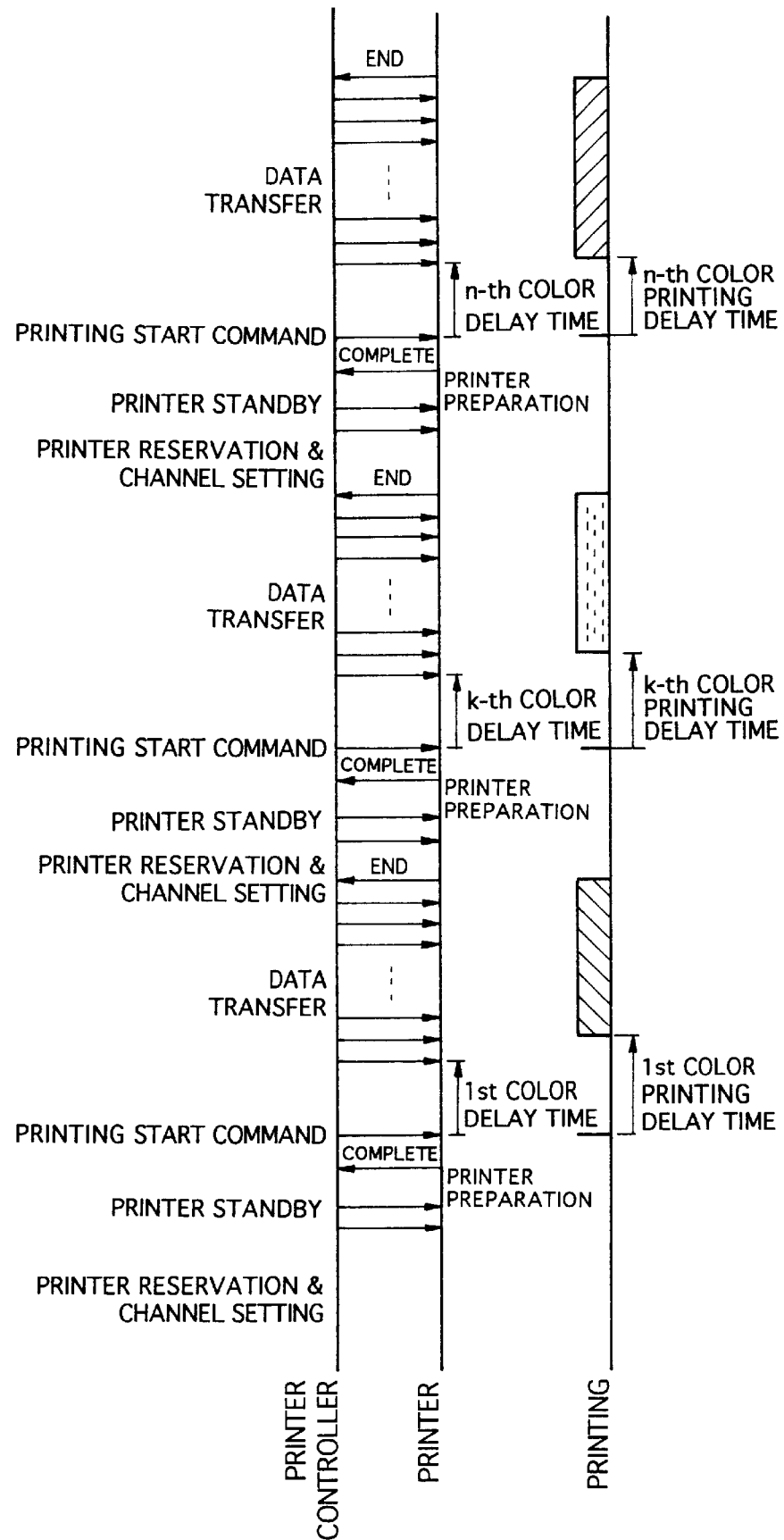
FIG. 8 is a time chart for a case in which image data is transmitted from the printer controller to the printer.

FIG. 8 illustrates the manner in which image data is transferred from the printer controller to the printer. This diagram corresponds to FIG. 3.

In case of the transfer of image data shown in FIG. 8, the transfer of image data illustrated in FIG. 3 is performed a plurality of times for every color in order to print an image of one frame. When the transfer of one frame of the image is finished for one color, the printing paper is returned to the home position again and the transfer of one frame of image data regarding the next color is carried out. One frame of image data is transmitted from the printer controller to the printer color by color. A high-definition color image is printed as a result.

(3) Second Embodiment

Figure 9:
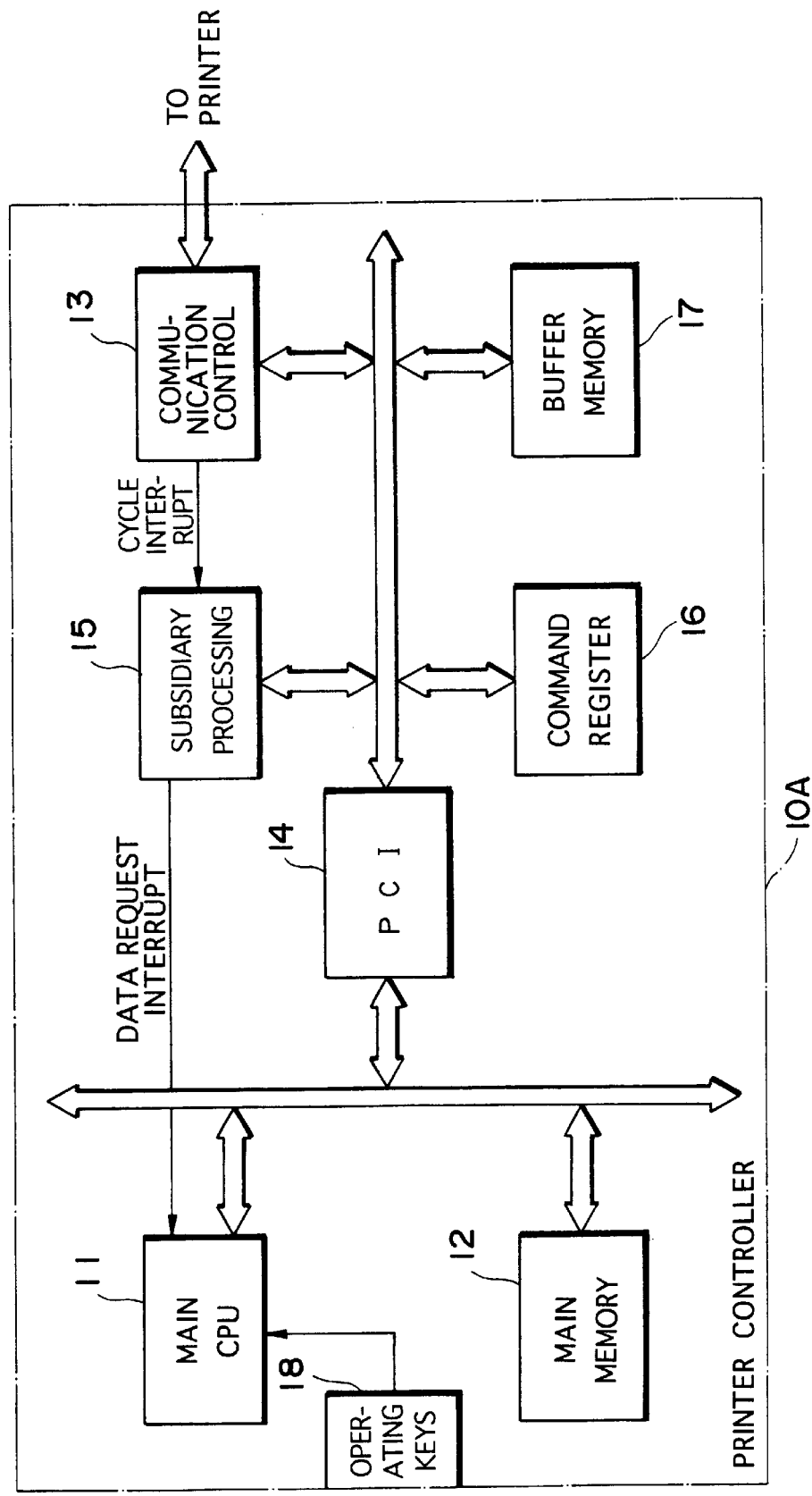
FIG. 9 is a block diagram illustrating the electrical configuration of a printer controller.

FIG. 9 is a block diagram illustrating the electrical configuration of a printer controller 10A illustrating a second embodiment of the invention. Elements in FIG. 9 identical with those shown in FIG. 1 are designated by like reference characters and need not be described again.

The printer controller 10A shown in FIG. 9 is further provided with a subsidiary processing circuit 15. The latter performs a transfer of data with the main CPU 11 via a PCI (peripheral component interconnect) 14. The printer controller 10A further includes a command register 16 for temporarily storing commands transferred between the main CPU 11 and the subsidiary processing circuit 15.

The image data that has been stored in the main memory 12 is read out and transferred temporarily to a buffer memory 17 by the subsidiary processing circuit 15. Image data that has been stored in the buffer memory 17 is applied to the transmission transfer memory 13A included in the communication control circuit 13 and is transmitted to the printer 20.

In the printer controller 10A shown in FIG. 9, the readout of image data from the main memory 12 is carried out by the subsidiary processing circuit 15, which lightens the load upon the main CPU 11.

The printer controller 10A shown in FIG. 9 is further provided with operating keys 18. By using the operating keys 18, the user is capable of entering the specifications of the printer to which the image data is to be sent. As a result, the number of times data is sent and received between the printer controller 10A and the printer 20 can be reduced. The printer controller 10A may be provided with a memory which stores printer specifications for each and every printer, the printer specifications may be read out of the memory and they may be selected by the operating keys 18.

(4) Third Embodiment

Figure 10:
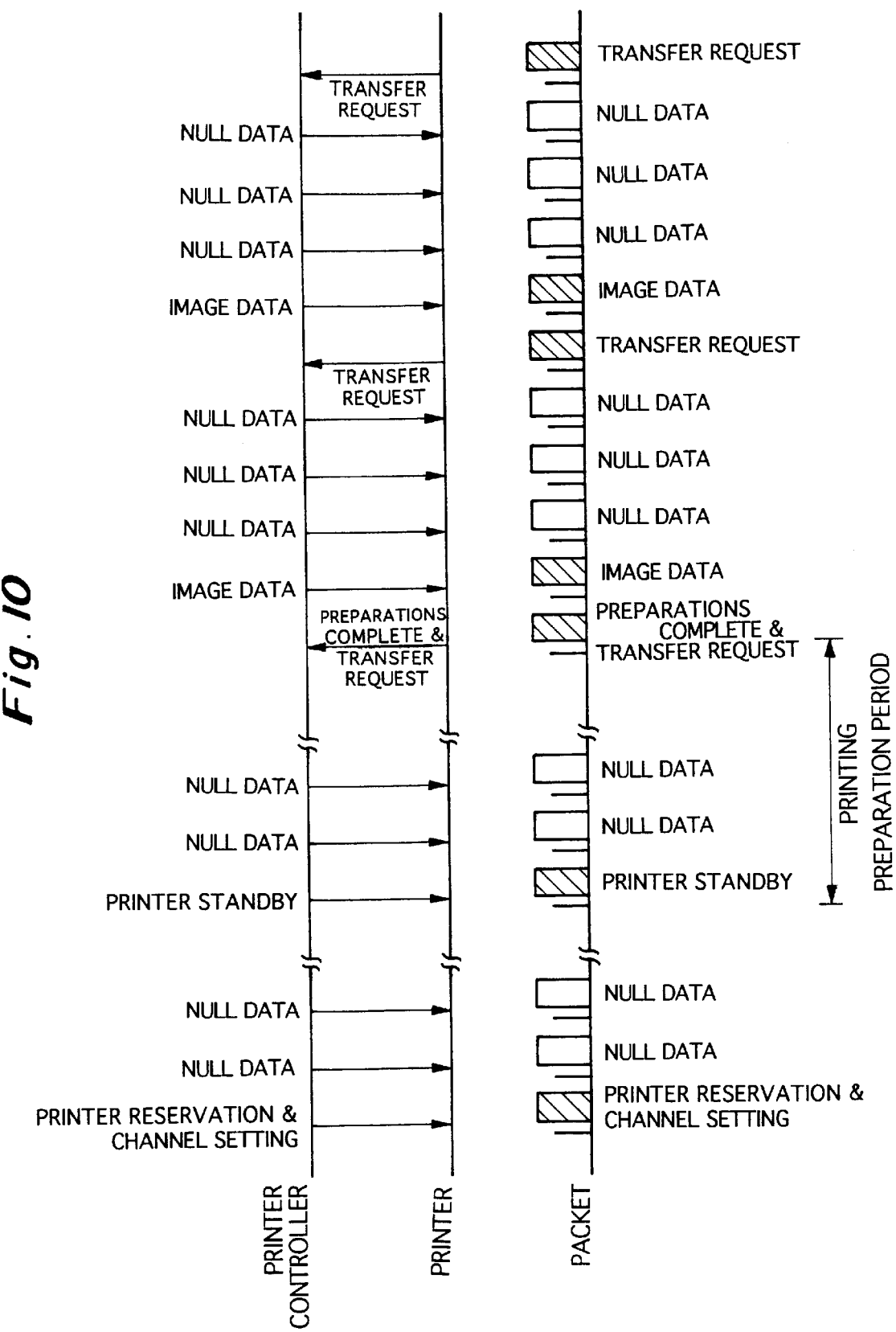
FIG. 10 is a time chart for a case in which image data is transmitted from the printer controller to the printer.
Figure 11:
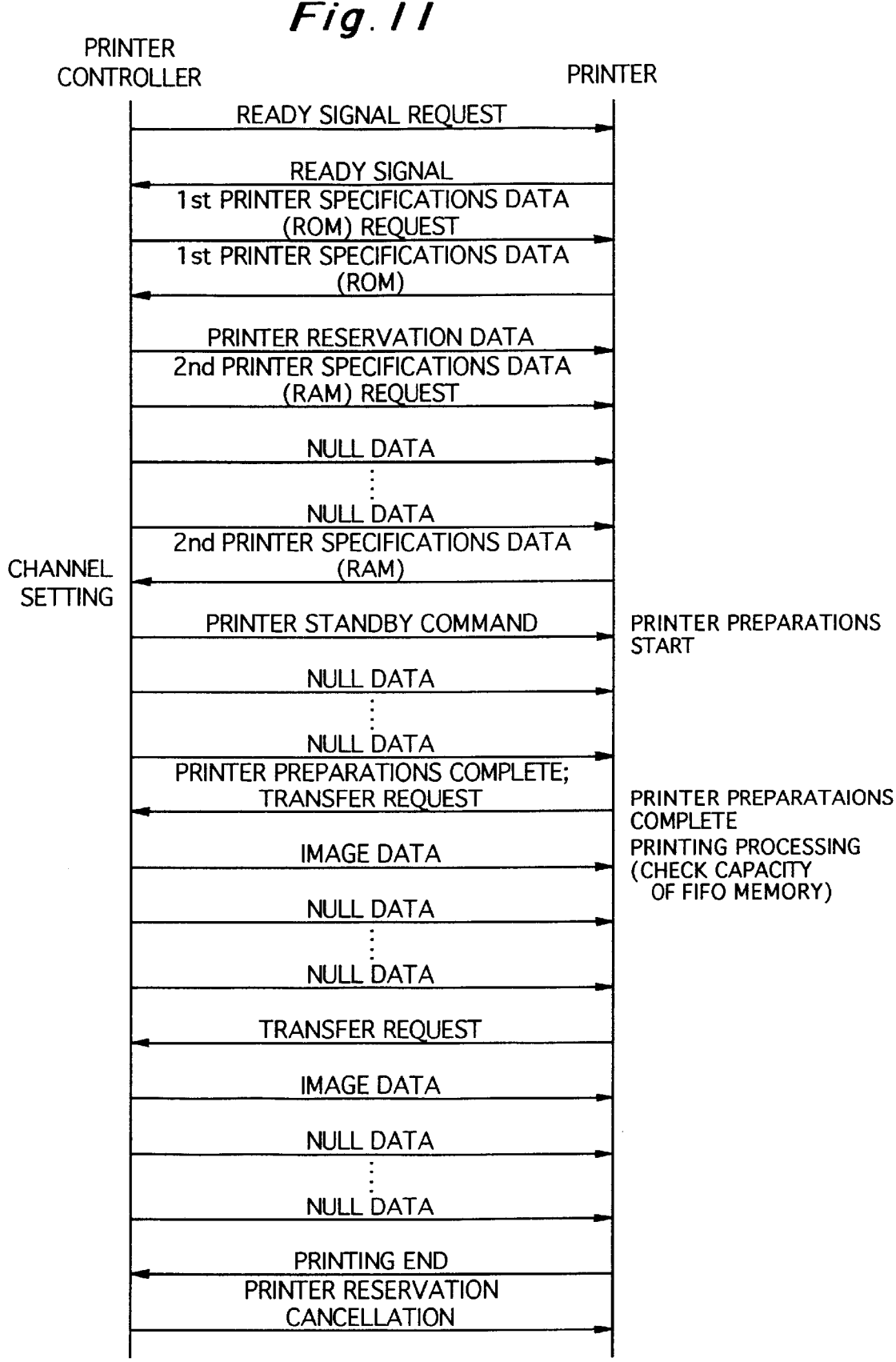
FIG. 11 illustrates commands and data sent and received by the printer controller and printer in a case where image data is transmitted from the printer controller to the printer.

FIG. 10 is a time chart for a case where image data is transmitted from the printer controller 10 to the printer 20, and FIG. 11 illustrates the manner in which commands and data are sent and received by the printer controller 10 and printer 20 when image data are transmitted from the printer controller 10 to the printer 20. Only the differences with respect to the time charts of FIGS. 3 and 4 and sending and receiving of the commands and data will be described.

According to the third embodiment, the request for transfer of image data is output by the printer 20 and applied to the printer controller 10. When the transfer request enters the printer controller 10, the image data is transmitted from the printer controller 10 to the printer 20 by the communication control circuit 13 in response to the transfer request.

Further, null data is transmitted from the printer controller 10 to the printer 20 from the time the command requesting the second printer specifications data is transmitted to the time the second printer specifications data is received. It should be noted that transmission data in the format of the asynchronous data packet shown in FIG. 18 or image data in the format of the isochronous data packet shown in FIG. 21 is referred to as null data.

When a channel number has been set and printing preparations in the printer 20 have been completed, the printer outputs data indicating the completion of printing preparations and transfer request data. These items of data are applied to the printer controller 10. Null data is transmitted from the printer controller 10 to the printer 20 from the transmission of the printing standby command to the reception of the data indicating the completion of printing preparations and the transfer request data.

When the data indicating the completion of printing preparations and the transfer request data are output by the printer 20, transmission image data (printing data) of an amount capable of being transmitted in one packet is read out of the main memory 12 and applied to the transmission transfer memory 13A included in the communication control circuit 13, whereby the data is stored temporarily. A packet is generated in the communication control circuit 13 in accordance with the format shown in FIG. 20. When image data representing the initial part of an image is transmitted, the synchronizing bit Sy is made "1" so as to indicate this fact. The image data thus generated is transmitted from the printer controller 10 following output of the data indicating the completion of printing preparations and the transfer request data. The data is received by the printer 20.

One packet of data transmitted from the printer controller 10 is written to the FIFO memory 26 in successive fashion under the control of the system controller 21.

The image data that has been stored in the FIFO memory 26 is read out in accordance with the data request signal from the printer engine 28 and the image data is applied to the printer engine 28 via the data processing circuit 27. As a result, the image is printed at a constant speed by the printing head contained in the printer engine 28.

When a transfer completion interrupt enters the system controller 21 from the FIFO memory 26 in the printer 20, the system controller 21 outputs a transfer request command. This command is applied to the printer controller 10 from the communication control circuit 25. In response to application of the transfer request command to the printer controller 10, a packet is generated again in accordance with the format shown in FIG. 21 and the image data is transmitted from the printer controller 10 to the printer 20. Thus, the timing of transmission image data from the printer controller 10 to the printer 20 is stipulated by the transfer request command applied to the printer controller 10 from the printer 20. Null data is transmitted from the printer controller 10 to the printer 20 after the transmission of the image data until transfer request command arrives.

Since the image data is transmitted from the printer controller 10 to the printer 20 in response to entry of the transfer request command, the printer 20 need not be provided with an image memory having a large storage capacity capable of storing one frame of image data. Printing at a constant speed is made possible merely by providing the FIFO memory 26 that is capable of storing only a few lines of image data.

When data representing the final part of the image is read out of the main memory 12, the synchronizing bit Sy is set to "2" so as to represent the final part of the image and packet data is generated in the communication control circuit 13. The final part of the image data is transmitted from the printer controller 10 to the printer 20, whereupon the transmission of one frame of image data ends.

When transmission of the image data ends, data indicative of the end of printing is supplied from the printer 20 to the printer controller 10. When the printer controller 10 receives the data indicating the end of printing, the printer controller 10 applies a printer deactivation command to the printer 20. When the printer 20 receives the printer deactivation command, the image data that has been stored in the RAM 22 is erased and the printer 20 is initialized.

When the null data is transmitted, the synchronizing bit Sy may be set to "4". As a result, whether null data is present or not can be detected by reading the content of the synchronizing bit Sy. The data which the printer 20 receives need not be transferred to the FIFO memory 26 when the null data is detected.

In the third embodiment described above, the system controller 21 of the printer 20 outputs the transfer request command and applies it to the printer controller 10 in response to entry of the transfer completion interrupt output by the FIFO memory 26. However, an arrangement may be adopted in which the amount of data that has been stored in the FIFO memory 26 is monitored by the system controller 21 and the system controller 21 outputs the transfer request when the amount of data that has been stored in the FIFO memory 26 becomes small.

(5) Fourth Embodiment

Figure 12:
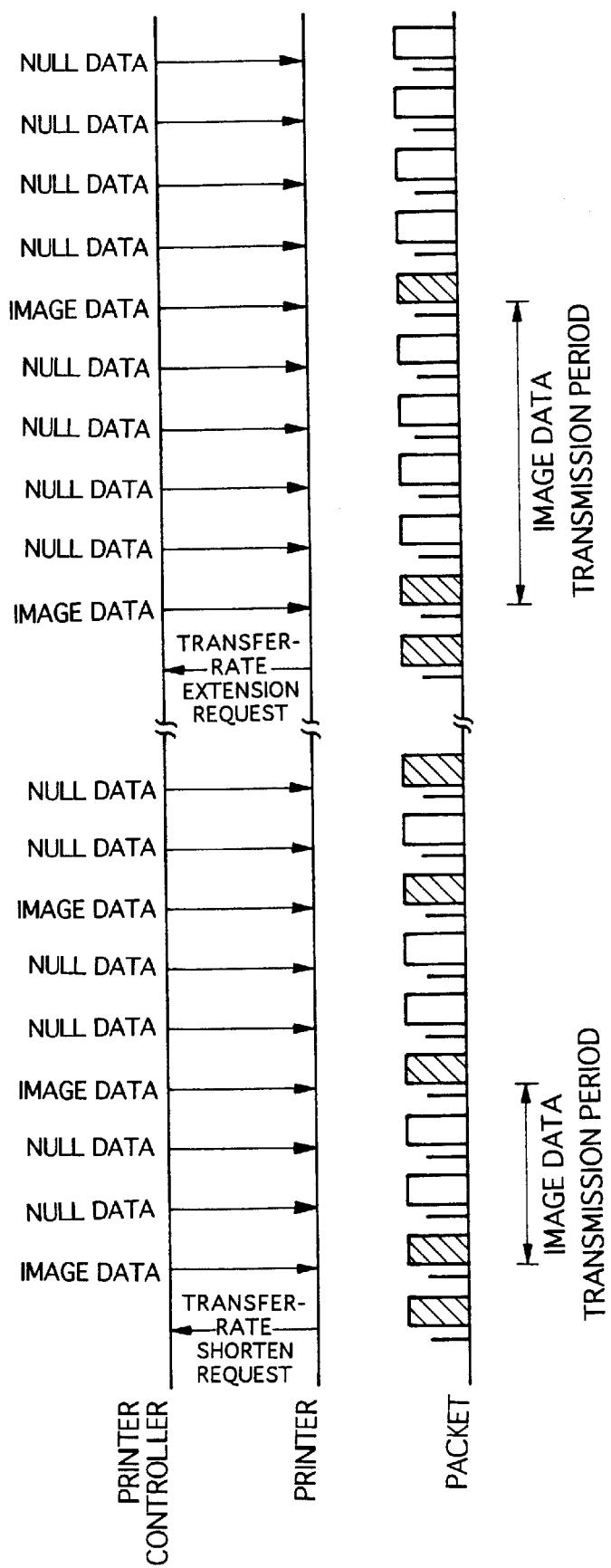
FIG. 12 is a time chart for a case in which image data is transmitted from the printer controller to the printer.
Figure 13:
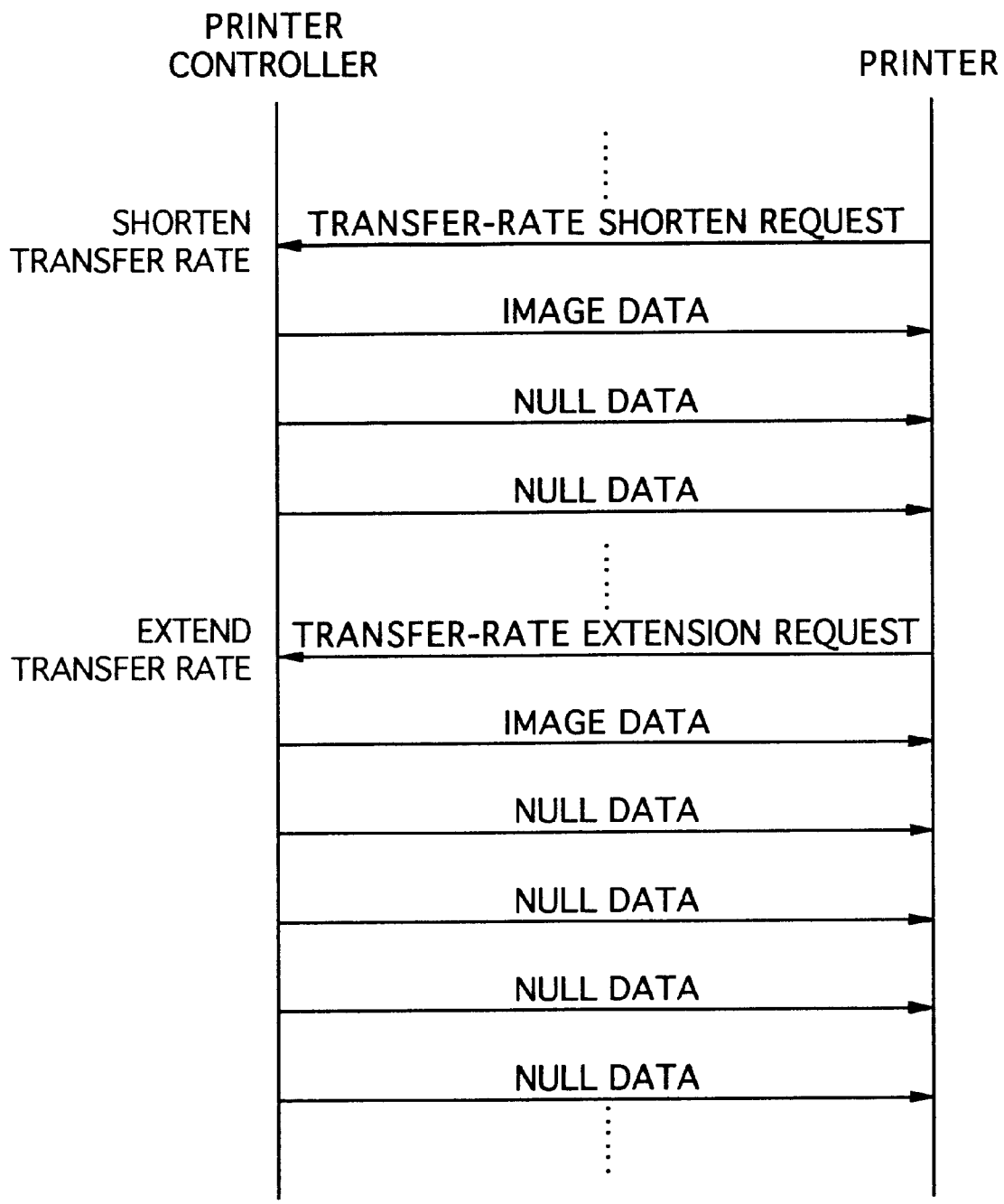
FIG. 13 illustrates commands and data sent and received by the printer controller and printer in a case where image data is transmitted from the printer controller to the printer.

FIGS. 12 and 13 illustrate a fourth embodiment. FIG. 12 is a time chart for a case where image data is transmitted from the printer controller 10 to the printer 20, and FIG. 13 illustrates part of the transmission and reception of commands and data between the printer controller 10 and printer 20 when image data are transmitted from the printer controller 10 to the printer 20.

In the embodiment illustrated in FIGS. 12 and 13, the printer 20 provides the printer controller 10 with a transfer rate representing the transmission period of the image data. The printer controller 10 transmits the image data to the printer 20 at a transmission period that is in accordance with the transfer rate provided by the printer 20.

When the processing for transmitting image data from the printer controller 10 to the printer 20 is being repeated, there are instances where the FIFO memory 26 is emptied because the reception period (transmission period) of the image data is long. In the embodiment illustrated in FIGS. 12 and 13, the system controller 21 of the printer 20 monitors the FIFO memory 26 and judges whether the FIFO memory 26 will be emptied if the current transfer rate were to be maintained. In a case where the FIFO memory 26 would be emptied, the system controller 21 outputs a transfer-rate short request command which represents shortening of the transfer rate. This command is applied to the printer controller 10. Upon entry of this command, the printer controller 10 shortens the transmission period of the image data. As a result, emptying of the FIFO memory 26 can be prevented and continuity of the image data can be maintained.

When the processing for transmitting image data from the printer controller 10 to the printer 20 is being repeated, there are instances where the received image data overflows from the FIFO memory 26 and can no longer be stored in the FIFO memory 26 because the reception period of the image data is short. In the embodiment illustrated in FIGS. 12 and 13, the system controller 21 of the printer 20 monitors the FIFO memory 26 and judges whether the image data will overflow from FIFO memory 26 if the current transfer rate were to be maintained. In a case where the received image data would overflow from the FIFO memory 26, the system controller 21 outputs a transfer-rate extension request command which represents extension of the transfer rate. This command is applied to the printer controller 10. Upon. entry of this command, the printer controller 10 lengthens the transmission period of the image data. As a result, overflow of the received image data from the FIFO memory 26 in the printer 20 can be prevented and continuity of the image data can be maintained.

In the fourth embodiment described above, the transfer rate of image data transmission is changed if it appears that the FIFO memory 26 will be emptied or that the image data will overflow from the FIFO memory 26. However, these situations may be dealt with by adjusting the amount of image data contained in a packet without changing the transfer rate. More specifically, if it appears that the FIFO memory 26 will be emptied, a command for enlarging the amount of image data contained in one packet is supplied from the printer 20 to the printer controller 10. If it appears that the image data will overflow from the FIFO memory 26, a command for reducing the amount of image data contained in one packet is supplied from the printer 20 to the printer controller 10.

(6) Fifth Embodiment

Figure 14:
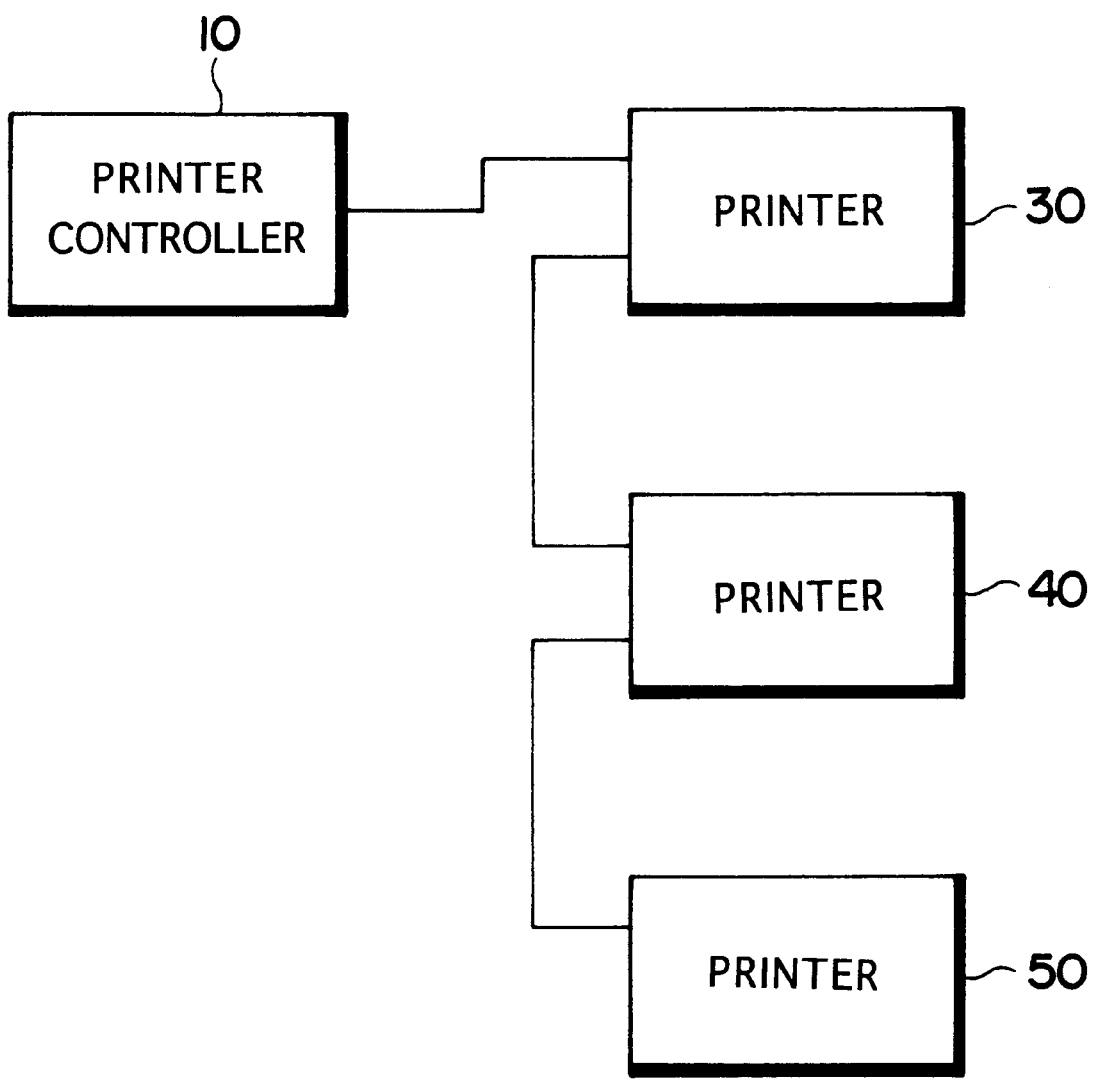
FIG. 14 illustrates an example of the connections between printers and the printer controller.
Figure 15:
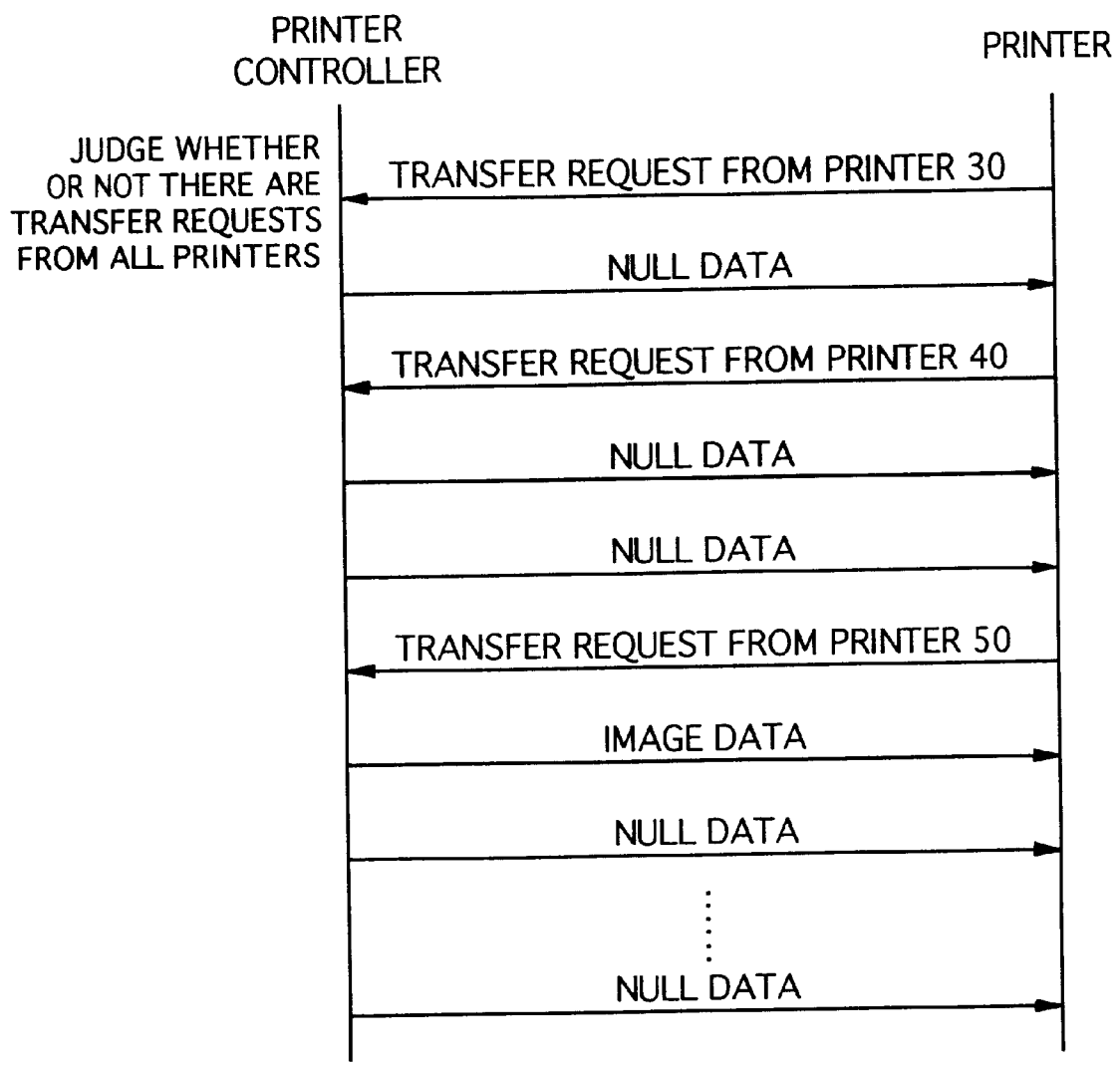
FIG. 15 illustrates commands and data sent and received by the printer controller and printer in a case where image data is transmitted from the printer controller to the printer.

FIGS. 14 and 15 illustrate a fifth embodiment of the present invention. FIG. 14 illustrates an example of the connection between the printer controller and printers, and FIG. 15 shows the manner in which commands and data are sent and received by the printer controller 10 and printers 30, 40 and 50 when image data is transmitted.

As shown in FIG. 14, a plurality of printers 30, 40 and 50 are connected to the printer controller 10 by cables that conform to IEEE Standard 1394.

In the embodiment illustrated in FIGS. 14 and 15, image data is transmitted from the printer controller 10 when a transfer request is output from all of the printers 30, 40 and 50 connected to the printer controller 10. Regardless of which printer among the printers 30, 40 and 50 connected to the printer controller 10 outputs a transfer request, the printer controller 10 outputs null data until transfer requests are output from all of the printers 30, 40 and 50 connected to the printer controller 10.

In the embodiment illustrated in FIG. 14, the image data is transmitted from the printer controller 10 when transfer requests have been output from all of the printers 30, 40 and 50 connected to the printer controller 10. This makes it possible to realize broadcasting of image data (namely the transmission of identical data to all nodes).

As many apparently widely different embodiments of the present invention can be made without departing from the spirit and scope thereof, it is to be understood that the invention is not limited to the specific embodiments thereof except as defined in the appended claims.

What is claimed is:

1. A printer system, comprising:
   a printer controller and a printer connected by a bus, wherein said printer controller supplies said printer with image data via the bus and said printer prints an image at a constant speed, wherein said image is represented by the image data supplied from said printer controller,
   said printer including a buffer memory possessing a fixed-size image-data storage capacity smaller than a quantity of image data representing one frame of the image, said buffer memory temporarily storing the image data supplied from said printer controller, and said printer having an output device outputting an image-data transfer request,
   said printer controller including an image-data transmission controller for transmitting the image data to said printer in image-data packet units in response to the image-data transfer request,
   said printer including a storage controller for receiving the image data packet units transmitted from said printer controller and storing the image data packet units in said buffer memory; and
   said printing controller reading out the image data packet units stored in said buffer memory and for printing the image,
   wherein said image-data transmission controller selectively changes an amount of image data included in each of the image data packet units in accordance with said constant speed of said printer and said fixed-size image-data storage capacity of said buffer memory, said image-data transmission controller transmitting the image data to the printer so that the image data stored in said buffer memory is not emptied from said buffer memory.

2. The system according to claim 1, wherein said printer outputs the image-data transfer request whenever one line of one frame of the image is printed.

3. The system according to claim 1, wherein said printer controller further provides a null-data transmission responsive to a first image-data transfer request from said output device of said printer,
   said null-data transmission being repeated in packet units until a second image-data transfer request is received from said output device after the image data has been transmitted by said image-data transmission controller.

4. The system according to claim 1, wherein said output device of said printer outputs the image-data transfer request in such a manner that the image data stored in the buffer memory will not be emptied from said buffer memory.

5. The system according to claim 1, wherein said printer performs printing-related preparations in response to entry of a printing-preparation setting request command and outputs the image-data transfer request upon completion of said printing-related preparations.

6. The system according to claim 5, wherein the printing-preparation setting request command is output from said printer controller,
   said printer controller further including a null-data transmission controller for repeating transmission of null data in packet units until said image-data transfer request is received from said output device after output of the printing-preparation setting request command.

7. The system according to claim 1, further comprising a plurality of printers connected to said printer controller,
   said printer controller outputting image data to desired printers of said plurality of printers in packet units in response to an output of associated image-data transfer requests from said desired printers.

8. A printer controller used in a printer system, comprising:
   a printer controller and a printer connected by a bus, wherein said printer controller supplies said printer with image data via the bus and said printer prints an image at a constant speed, wherein said image is represented by the image data supplied from said printer controller,
   said printer being provided with a buffer memory possessing a fixed-size image-data storage capacity smaller than a quantity of image data representing one frame of the image, said buffer memory temporarily storing the image data supplied from said printer controller, and said printer having means for outputting an image-data transfer request,
   said printer controller including an image-data transmission controller for changing an amount of image data included in a packet in accordance with said constant speed of said printer and said fixed-size image-data storage capacity of said buffer memory, said image-data transmission controller transmitting the image data to said printer in packet units in response to the image-data transfer request from said printer so that the image data stored in the buffer memory will not be emptied from the buffer memory.

9. A printer comprising:
   a buffer memory possessing a fixed-size image-data storage capacity smaller than a quantity of image data representing one frame of an image, said buffer memory temporarily storing the image data;

a printing preparation controller for performing printing-related preparation in response to a printing-preparation setting request;

a storage controller for accepting storage of image data in said buffer memory, the image data being changed in accordance with a constant speed of said printer and the fixed-size image-data storage capacity of said buffer memory such that the image data stored in the buffer memory will not be emptied from said buffer memory upon completion of the printing-related preparations in said printing preparation controller; and a printing controller for reading out the image data that has been stored in said buffer memory and for printing an image at said constant speed, said image being represented by the image data.

10. A method of controlling operation of a printer system comprising a printer controller and a printer connected by a bus, wherein said printer controller supplies said printer with image data via the bus and said printer prints an image at a constant speed, the image being represented by the image data supplied from said printer controller, the method comprising:

providing said printer with a buffer memory possessing a fixed-size image-data storage capacity smaller than a quantity of image data representing one frame of the image;

temporarily storing the image data supplied from said printer controller in the buffer memory;

outputting an image-data transfer request from an output device;

transmitting image data to said printer from the printer controller in packet units in response to the image-data transfer request;

receiving image data transmitted from said printer controller to the printer and storing the image data in said buffer memory;

reading out the image data that has been stored in said buffer memory and printing an image at a constant speed; and controlling an amount of image data included in each of the image data packet units by the image-data transmission controller in accordance with said constant speed of said printer and said fixed-size image-data storage capacity of said buffer memory, said image-data transmission controller transmitting the image data to the printer so that the image data stored in the buffer memory is not emptied from the buffer memory.

11. The method according to claim 10, wherein said step of outputting the image-data transfer request occurs whenever one line of one frame of the image is printed.

12. The method according to claim 10, wherein said step of transmitting image data to said printer controller includes responding to a first image-data transfer request by repeating transmission of null data in packet units until a second image-data transfer request is received after the image data has been transmitted by the printer controller.

13. The method according to claim 10, wherein said step of outputting an image-data transfer request includes ensuring that the image data stored in the buffer memory is not emptied from said buffer memory.

14. The method according to claim 10, further comprising:

performing printing-related preparations in response to entry of a printing-preparation setting request command; and outputting the image-data transfer request upon completion of the printing-related preparations.

15. The method according to claim 14, wherein said performing printing-related preparations step is conducted in response to the printing-preparation setting request command being output from said printer controller;

said printer controller repeating transmission of null data in packet units until an output of said image-data transfer request is received by said printer controller after output of the printing-preparation setting request command.

16. The method according to claim 10, further comprising:

connecting a plurality of printers to said printer controller; and outputting the image data to desired printers of said plurality of printers in packet units in response to output of associated image-data transfer requests from said desired printers.

17. A method of controlling operation of a printer controller used in a printer system comprising the printer controller and a printer connected by a bus, wherein said printer controller supplies said printer with image data via the bus and said printer prints the image at a constant speed, the image being represented by the image data supplied from said printer controller, said printer being provided with a buffer memory possessing a fixed-size image data storage capacity smaller than a quantity of image data representing one frame of the image and temporarily storing the image data supplied from said printer controller, and said printer having means for outputting an image-data transfer request, said method comprising:

transmitting image data to said printer in packet units in response to the image-data transfer request output from said printer; and changing an amount of image data included in the packet units in accordance with said constant speed of said printer and said fixed-size image-data storage capacity of said buffer memory, wherein said transmitting image data to said printer step is performed so that the image data stored in the buffer memory is not emptied from the buffer memory.

18. A method of controlling operation of a constant speed printer having a buffer memory possessing fixed-size image-data storage capacity smaller than a quantity of image data representing one frame of an image and temporarily storing the image data, comprising the steps of:

performing printing-related preparations in response to a printing-preparation setting request;

accepting storage of image data in said buffer memory upon end of the printing-related preparations; and reading out the image data that has been stored in said buffer memory and printing the image at said constant speed, the image being represented by the image data read out, wherein the image data is changed in accordance with said constant speed of said printer and said fixed-size image-data storage capacity of said buffer memory in such a manner that the image data stored in the buffer memory will not be emptied from the buffer memory upon completion of said performing printing-related preparations step.

* * * * *

UNITED STATES PATENT AND TRADEMARK OFFICE
CERTIFICATE OF CORRECTION

PATENT NO. : 6,636,325 B1
DATED : October 21, 2003
INVENTOR(S) : Hiroyuki Kurase It is certified that error appears in the above-identified patent and that said Letters Patent is hereby corrected as shown below:

<u>Drawings</u>,
Figures 4 and 11, change "PREPARATAIONS" to -- PREPARATIONS --;
Figure 19, change "LABLE" to -- LABEL --; and
Figures 21 and 22, change "ASYNCHRONOUS" to -- ISOCHRONOUS --.

Signed and Sealed this

Ninth Day of March, 2004

JON W. DUDAS
*Acting Director of the United States Patent and Trademark Office*